United States Patent
Backhaus et al.

(10) Patent No.: US 8,112,969 B2
(45) Date of Patent: Feb. 14, 2012

(54) TRANSPORT SYSTEM FOR BOTTLES OR SIMILAR CONTAINERS AND PLANT FOR THE TREATMENT OF BOTTLES OR SIMILAR CONTAINERS

(75) Inventors: Martin Backhaus, Dortmund (DE); Thomas Stienen, Dortmund (DE)

(73) Assignee: KHS AG, Dortmund (DE)

( * ) Notice: Subject to any disclaimer, the term of this patent is extended or adjusted under 35 U.S.C. 154(b) by 197 days.

(21) Appl. No.: 12/235,895

(22) Filed: Sep. 23, 2008

(65) Prior Publication Data

US 2009/0077933 A1    Mar. 26, 2009

Related U.S. Application Data

(63) Continuation-in-part of application No. PCT/EP2007/001066, filed on Feb. 8, 2007.

(30) Foreign Application Priority Data

Mar. 24, 2006  (DE) .......................... 10 2006 013 800

(51) Int. Cl.
*B65B 3/00* (2006.01)
(52) U.S. Cl. ........... 53/251; 53/282; 53/561; 198/347.1; 198/459.2
(58) Field of Classification Search .............. 53/561, 53/251, 253, 282, 284.5; 198/347.1, 459.2
See application file for complete search history.

(56) References Cited

U.S. PATENT DOCUMENTS

| 3,875,725 | A | * | 4/1975 | Carmichael ..................... 53/485 |
| 4,084,686 | A | * | 4/1978 | Calhoun ..................... 198/464.4 |
| 4,467,908 | A | * | 8/1984 | Schneider ..................... 198/441 |
| 4,691,496 | A | * | 9/1987 | Anderson et al. ................. 53/53 |
| 4,802,571 | A | * | 2/1989 | Born et al. ................. 198/626.1 |
| 4,878,333 | A | * | 11/1989 | Sommerfield ..................... 53/53 |
| 5,261,207 | A | * | 11/1993 | Bedin .......................... 53/284.5 |
| 5,737,898 | A | * | 4/1998 | Grimm et al. .................. 53/48.1 |
| 5,878,796 | A | * | 3/1999 | Phallen .......................... 141/169 |
| 5,996,322 | A |   | 12/1999 | La Barre |
| 6,168,004 | B1 |   | 1/2001 | Drewitz et al. |
| 6,446,781 | B1 | * | 9/2002 | DeVillele ..................... 198/364 |
| 6,520,318 | B1 | * | 2/2003 | Humele ..................... 198/483.1 |
| 2005/0104263 | A1 | * | 5/2005 | Larsen .......................... 264/542 |

FOREIGN PATENT DOCUMENTS

| DE | 198 24 846 | 12/1999 |
| DE | 199 22 873 | 11/2000 |
| DE | 199 28 325 | 12/2000 |

OTHER PUBLICATIONS

International Search Report PCT/EP2007/001066 and English translation thereof.
International Preliminary Report on Patentability PCT/EP2007/001066 and English translation thereof.
Chinese Office Action 200780014970.5 and English Translation thereof.

* cited by examiner

*Primary Examiner* — Thanh Truong
(74) *Attorney, Agent, or Firm* — Nils H. Ljungman & Associates

(57) ABSTRACT

This present application relates to a transport system for the transport of bottles or similar containers between at least a first machine, for example a blow molding machine for the manufacture of the containers out of plastic, and at least one second machine, for example a filling machine.

20 Claims, 13 Drawing Sheets

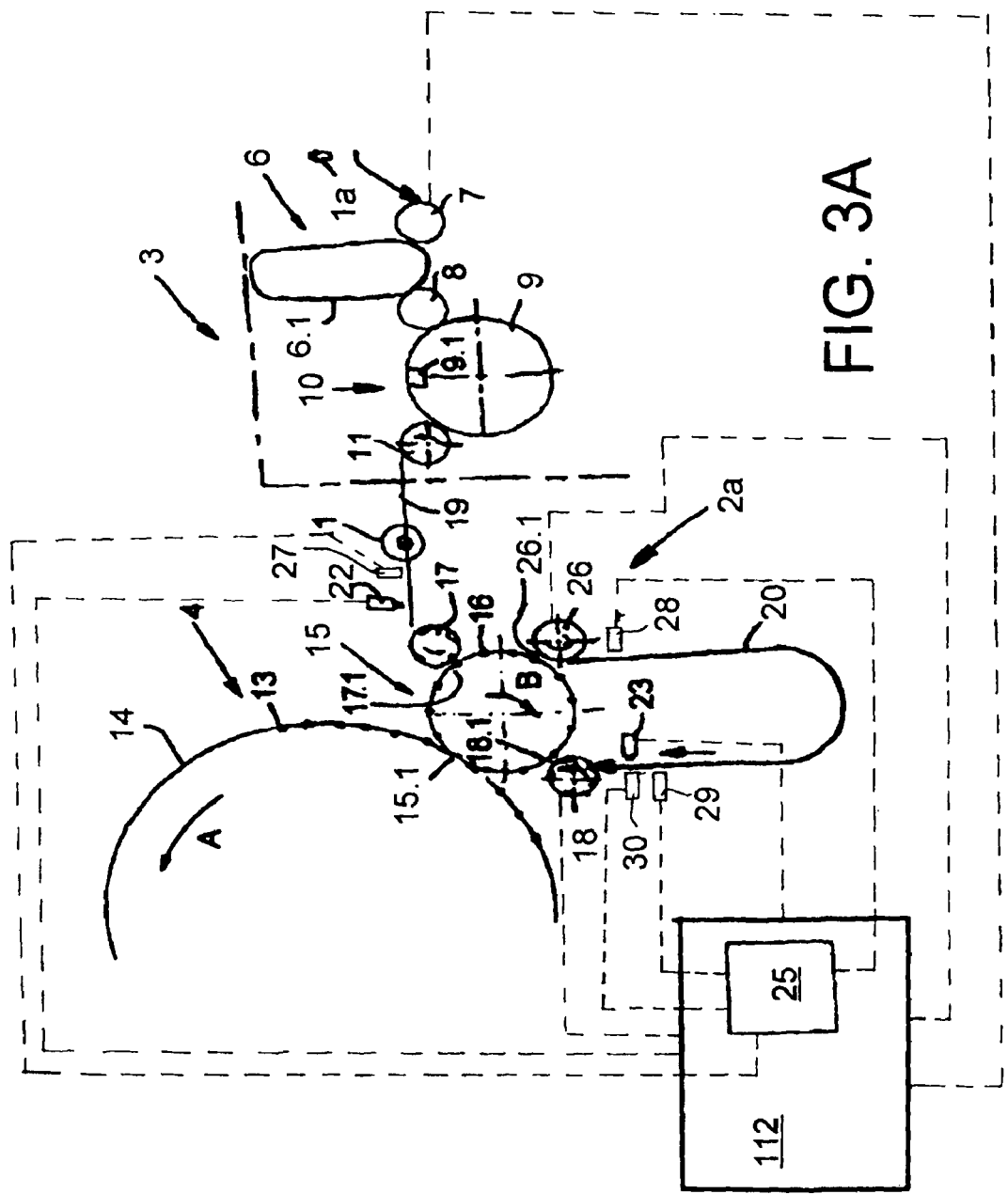

TRANSPORT SYSTEM FOR BOTTLES OR SIMILAR CONTAINERS AND PLANT FOR THE TREATMENT OF BOTTLES OR SIMILAR CONTAINERS

CONTINUING APPLICATION DATA

This application is a Continuation-In-Part application of International Patent Application No. PCT/EP2007/001066, filed on Feb. 8, 2007, which claims priority from Federal Republic of Germany Patent Application No. 10 2006 013 800.7, filed on Mar. 24, 2006. International Patent Application No. PCT/EP2007/001066 was pending as of the filing date of this application. The United States was an elected state in International Patent Application No. PCT/EP2007/ 001066.

BACKGROUND

1. Technical Field

This present application relates to a transport system and to a plant using such a transport system.

2. Background Information

Background information is for informational purposes only and does not necessarily admit that subsequently mentioned information and publications are prior art.

Some transport systems for the transport of bottles or similar containers between a first machine, for example a blow molding machine for the manufacture of the containers from plastic, and a second machine, for example a filling machine, comprise at least one transport element that can be driven in rotation with a plurality of container receptacles which are moved with the transport element past a plurality of transfer positions that are arranged one after another in a transport element circulation or transport direction. Some transport systems also comprise at least one transfer position of which is used for the feed of the containers from the first machine to the transport element and a transfer position for the forwarding of the containers to the second machine. The transport system of the prior art comprises essentially a transport element that is formed by a transfer star wheel and can be driven in rotation, with a plurality of container receptacles which are moved with the transport element past a total of three transfer positions that are arranged one after another in the direction or rotation of the transport element or in the direction of transport, one transfer position of which is used for the feed of the containers from the first machine to the transport element, one transfer position is used to advance the containers to a second machine and the third transfer position is used to advance the containers to at least one buffer line as well as to advance the containers from the buffer line back to the transport element. One disadvantage of this system of the prior art is that with this transport system it is not possible to continuously convey containers to the buffer line and to advance containers from the buffer line to the rotating transport element and thus to the second machine.

OBJECT OR OBJECTS

The object of the present application is a transport system which, in a continuous transport process, makes it possible to transfer containers outward into a buffer line as well as, potentially, to re-insert the containers from the buffer line into the container conveyor flow. The present application teaches that this object can be realized as a transport system for the transport of bottles or similar containers between a first machine, for example a blow molding machine for the manufacture of the containers from plastic, and a second machine, for example a filling machine, comprise at least one transport element that can be driven in rotation with a plurality of container receptacles which are moved with the transport element past a plurality of transfer positions that are arranged one after another in a transport element circulation or transport direction. This transport system also comprises at least one transfer position of which is used for the feed of the containers from the first machine to the transport element and a transfer position for the forwarding of the containers to the second machine, where of two different transfer positions, one of the transfer positions is used to advance the containers to at least one buffer line, and one transfer position is used to advance the containers from the buffer line to the transport element. Another object of the present application is a plant for the handling of bottles or similar containers with at least two machines which are connected to each other by means of the above-described transport system for the transport of the containers.

SUMMARY

The transport system according to the present application is suitable possibly for the transport of bottles or similar containers that are made of thermoplastic plastic, of PET for example, between a blow molding machine in which the containers are manufactured from heated pre-forms by stretch blow molding (blow molding) and a subsequent section of a total plant, e.g. of a downstream machine, such as a filling machine.

Blow molding machines for the manufacture of containers from thermoplastic plastic comprise essentially a heater station in which the pre-forms are heated at a controlled temperature profile, and a downstream blowing station in which the blow molding is performed at a high output and which generally comprises a rotor or blow wheel which is driven in rotation around a vertical machine axis with a plurality of blow molds. Both process steps, namely the preheating of the pre-forms and the subsequent blow molding, are coupled directly with each other. In one possible embodiment of the present application, the heater station is adapted to the output of the blowing station, among other things in terms of heating power and transport capacity. In practice, the blow molding machine is upstream of another part of an overall plant, for example a filling machine, which can then be formed directly as a single unit with the blow molding machine.

In blow molding machines for the manufacture of bottles, it may be desirable during a stoppage or a malfunction in the downstream portion of the overall plant or in the machine immediately or essentially immediately downstream to keep the blow molding machine running until all or most of the blow molds in the blowing station are cleared, i.e. until the blow molding machine has been completely or partially cleared. Depending on the configuration of the heater station upstream of the blow molding machine and/or the material of which the pre-forms being used are made, it may also be desirable in the event of a malfunction to completely clear the heating station, i.e. to blow all or most of the pre-forms that are in the heater station when the malfunction occurs into bottles.

The number of pre-forms and bottles involved therefore equals the number of pre-forms and bottles that would often be processed or manufactured in two minutes of undisrupted or uninterrupted operation of a blow molding machine. In blow molding machines of the prior art, the bottles that are produced during this emptying of the blow molding machine must or could be transferred outward and discarded.

The causes of malfunctions in a part of an overall plant that is downstream of the blow molding machine or in a machine immediately or generally downstream can vary widely. For example, malfunctions can be caused by a lack of operating media, a lack of product to be bottled in a downstream bottling machine, backups in connected transport systems, mechanical or electrical faults in complex control systems, etc. The clearing of the blow molding machine may result in significant material costs in high-capacity plants that are in continuous operation. The clearing of the blow molding machine also causes a significant delay in the resumption of the bottling process, because first pre-forms have to be heated in the blow molding machine, and bottles must or can then be molded from these pre-forms.

The transport system according to at least one possible embodiment of the present application is also especially well suited for the transport of bottles or similar containers made of plastic, and thereby possibly in a process in which the containers are held and transported suspended on a container flange or neck flange. The transport system according to the present application is also suitable possibly for the transport of bottles or containers between a blow molding machine and a downstream section, for example a downstream machine, of an overall plant. In the event of malfunctions or a stoppage of the downstream section of the overall plant it is then possible to place the bottles or containers that are manufactured during the clearing of the blow molding machine in the buffer line, and after the repair of the malfunction to advance these containers to the downstream section of the overall plant or in the downstream machine without delay and thereby also to bridge the time which is desired to restart the blow molding machine.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present application is explained in greater detail below with reference to the possible embodiments which are illustrated in the accompanying figures, in which:

FIG. 3A shows one embodiment of the transport system as illustrated in FIG. 3 with a control system and a monitor system to operate various components;

FIG. 3B shows the embodiment of transport system as illustrated in FIG. 3 with a possible sensor arrangement to monitor the starwheels of the transport system 2a;

DESCRIPTION OF EMBODIMENT OR EMBODIMENTS

Figure 1:
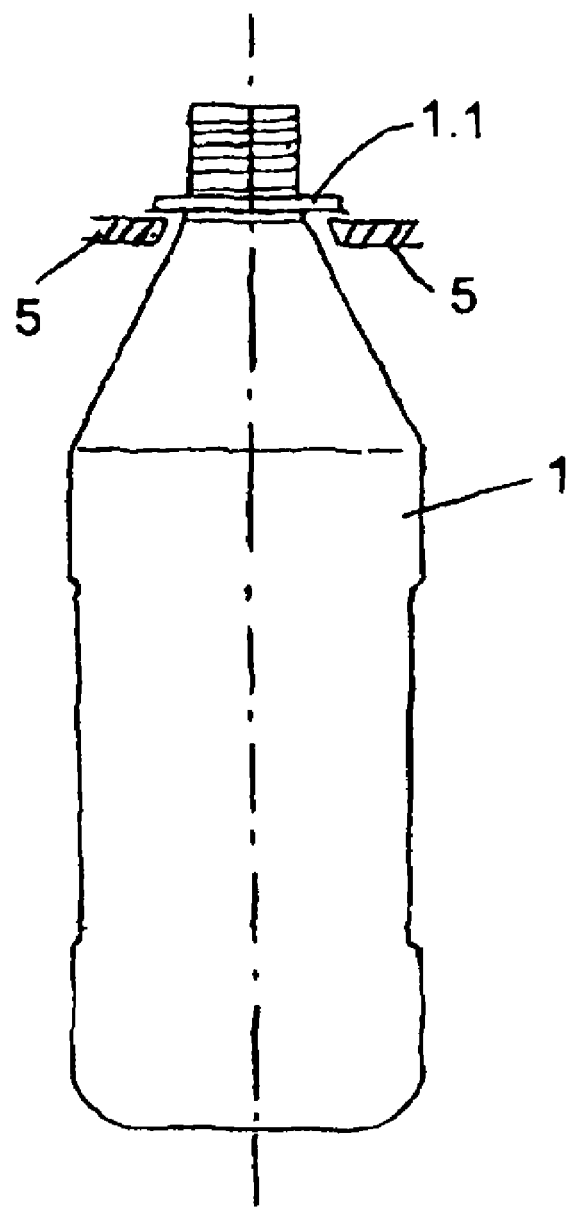
FIG. 1 shows a container that is realized in the form of a bottle and is held suspended on a functional element of a transport system.
Figure 2:
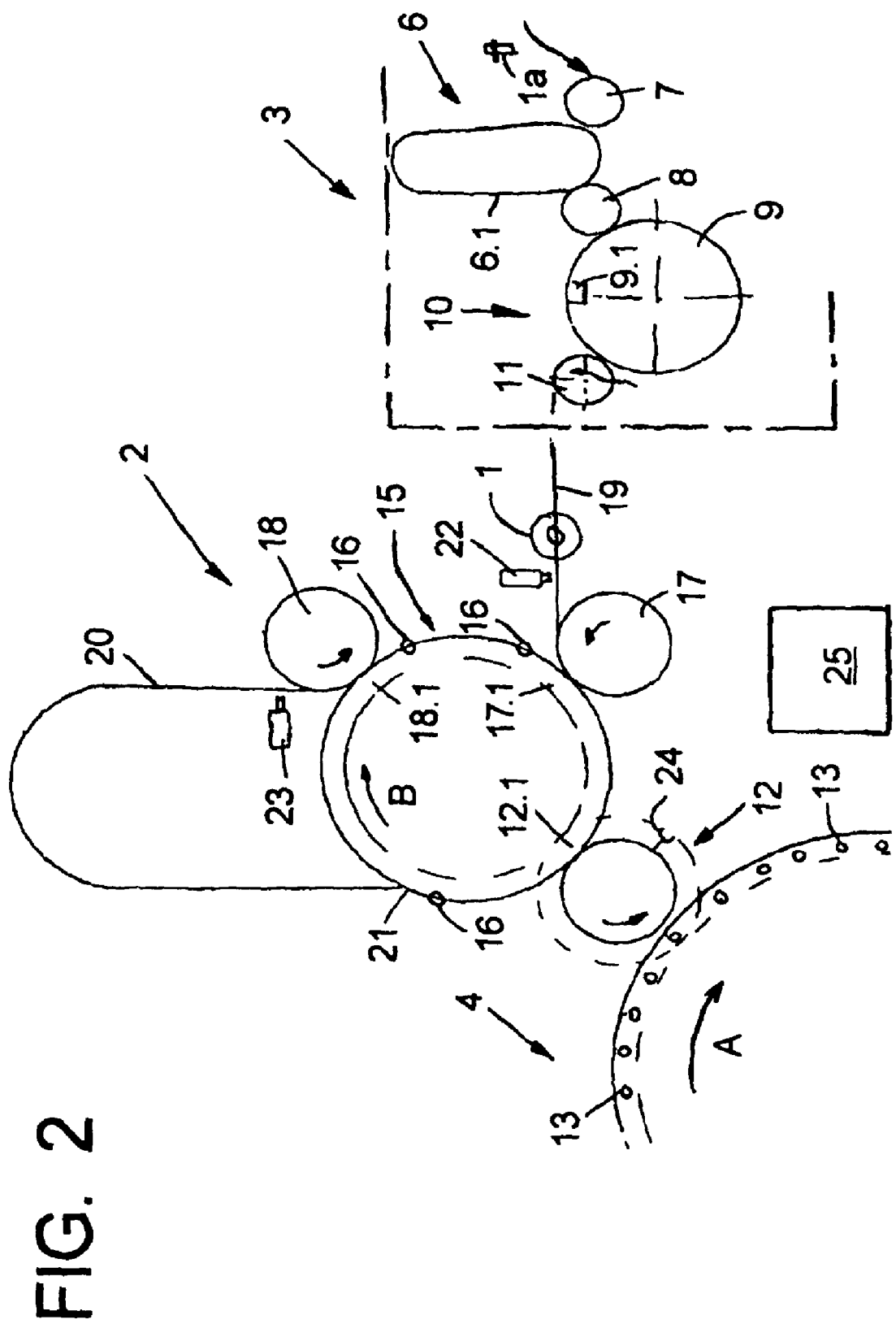
FIG. 2 is a schematic figure that shows one embodiment of a transport system for containers between two machines as illustrated in FIG. 1 in a plan view.

In the figures, 1 are bottles which are manufactured from a thermoplastic plastic, such as PET, for example, by blow molding or stretch blow molding and which, in the embodiment illustrated in FIG. 2, are transported via a transport system located there and designated 2 in general from a first blow molding machine 3 for the manufacture or blow molding of the bottles 1 to a downstream second machine, which can be a filling machine 4 that employs a rotary design, for example. Over the entire transport line 2, the bottles 1 are each held and guided suspended on a neck flange 1.1 on guides or other functional elements, as indicated schematically in FIG. 1 with the reference number 5.

The blow molding machine is constructed in a manner that is known to a technician skilled in the art, i.e. this machine comprises essentially a heater station 6 to which the pre-forms 1a made of thermoplastic material are fed via an inlet 7 and in which these pre-forms are moved by means of a conveyor 6.1 through at least one heating zone. The pre-forms 1a thus heated travel via an outlet 8 to a blow mold 9.1 of a blow molding station 10 which is moved past this outlet and is provided on a rotating rotor 9, in which blow molding station 10 the bottles 1 are produced by stretch blow molding from the heated pre-forms 1a, and then travel via the discharge 11 to the transport system 2.

One function of the transport system is that, during undisrupted or uninterrupted operation, the bottles 1 are moved from the blow molding machine 3 directly to the filling machine 4 or to the inlet star wheel 12 that forms the inlet of this machine, by means of which the bottles 1 are then transferred individually to one of the filling positions 13 which are provided in a manner known to a technician skilled in the art on the periphery of a rotor 14 that is driven in rotation around a vertical machine axis in the direction indicated by the arrow A and in which the bottles are held during the filling process 1 suspended by their neck flange 1.1.

An additional function of the transport system 2, in the event of a stoppage or a malfunction of the filling machine 4, is to buffer the bottles that are delivered by the blow molding machine 3 until, when the feed of the pre-forms 1a to the heater station 6 is stopped, the heat station 6 and the blow molding station 10 are completely cleared. In the event of a malfunction in the downstream filling machine 4, therefore, although the blow molding machine 3 is cleared in the desired manner, it may not be necessary to discard the bottles 1 that are manufactured during the process or to completely transfer them outward from the system.

To perform these functions, the transport system has, a central element, a transport or transfer star wheel 15 which can be driven in rotation around a vertical axis in the direction indicated by the arrow B, which transport or transfer star wheel 15 has on its periphery a plurality of receptacles 16 which hold a bottle 1 each in a suspended position. Associated with this transport star wheel 15 are the inlet star wheel 12 and two separation star wheels 17 and 18 which respectively form a container or bottle transfer on the transport star wheels 15, which are also each driven around a vertical machine axis in synchronization with the transport star wheel 15, and possibly so that these separation star wheels 17 and 18 each rotate in the opposite direction from the transport star wheel 15. The separation star wheel 17 forms the end of a transport line 19 which is connected with the discharge 11 of the blow molding 3 machine. The separation star wheel 18 forms the end of a buffer line 20 which runs between a buffer line inlet 21 and the separation star wheel 18.

In the illustrated possible embodiment, the equipment is arranged so that the separation star wheel 17 and the transfer position 17.1, formed by the separation star wheel 17, and the inlet star wheel 12 and the receptacle position 12.1, formed by the inlet star wheel 12, are offset from one another in the direction of rotation B of the transfer star wheel 15 by an angle of less than 180 degrees, and the receptacle position 12.1 follows the transfer position 17.1 in the direction of rotation B. Adjacent to the discharge position 12.1, in the direction of rotation B, is the buffer line inlet 21, which is then followed in the direction of rotation B of the separation star wheel 18 and the transfer position 18.1, formed by the separation star wheel 18, which is in turn followed in the direction of rotation B by the transfer position 17.1.

In the illustrated possible embodiment, the transport line 19 and the buffer line 21 are each formed essentially by a guide in which the bottles 1 are held suspended by their neck flange 1.1 and in which these bottles 1 are moved, for example, by feed air or compressed air.

On the transport line 19, at the inlet to the separation star wheel 17, there is an electrically controlled stopper 22 which, when activated, blocks the transport line 19 to restrict or hinder the movement of the bottles 2 to the separation star wheel 17 and when not activated opens the transport line 19 to allow the movement of the bottles 1 to the separation star wheel 17. A corresponding stopper 23 is provided on the buffer line 20 at the inlet to the separation star wheel 18.

The operation of the transport system 2 can be described as follows:

In operation with no stoppages or malfunctions, the bottles 1 that are delivered via the transport line 19 are transferred with the separation star wheel 17 individually to a receptacle 16 of the transfer star wheel 15 and then each travel via the transfer position 12.1 and the inlet star wheel 12 to a filling position 13 of the rotor 14. In the case of a malfunction or a stoppage of the filling machine 4, for example until the blow molding machine 3 has been completely cleared, the bottles 1 continue to be transported via the transport line 19 and the separation star wheel 17 to the transfer star wheel 15 and its receptacles 16, to the transfer position 12.1 but not to the inlet star wheel 12. The bottles instead travel via the buffer line inlet 21 into the buffer line 20, on which the bottles are moved toward the buffer line outlet or toward the separation star wheel 18, which is blocked, however, by the activated stopper 23. In one possible embodiment of the present application, the buffer line 20 is realized as a conveyor.

The holding capacity of the buffer line 20 is designed so that it can hold at least some or all or at least all of the bottles 1 that are manufactured during the clearing of the blow molding machine 3. During a malfunction or stoppage, the transfer star wheel 15 and the separation star wheels 17 and 18 continue to be driven in rotation. When the filling machine 4 restarts or after the malfunction has been repaired, first by the deactivation of the stopper 23, i.e. by opening the separation star wheel 18 and by activating the stopper 22, i.e. by blocking the separation star wheel 17, the bottles 1 that are being held in the buffer line 20 are each advanced one after another via the separation star wheel 18 to the transfer star wheel or to a receptacle 16, and then travel with the rotating transfer star wheel 15 to the transfer position 12.1, at which the bottles 1 are delivered to the inlet star wheel 12 and from the latter in turn are transferred individually to a filling position 13 of the rotor 14.

As soon as a sufficient number of bottles 1 are fed via the transport line 19 and the buffer line 20 is cleared or almost cleared, the stopper 23 is activated to block the separation star wheel 18 and the stopper 22 is deactivated to release the separation star wheel 17, so that the bottles 1 reach the filling machine 4 as described for undisrupted or uninterrupted operation.

Appropriate control means are provided, on one hand during operation and also during the restart of the filling machine 4 after a stoppage or a malfunction, to advance the bottles that are delivered via the transfer element 15 and its transfer star wheel 16 to the inlet star wheel 12, and on the other hand during a malfunction to transport the bottles 1 via the transfer star wheel 15 to the buffer line inlet 21. These control means are formed, for example, by one or more ejectors, which during undisrupted or uninterrupted operation and during the restart of the filling machine 4 move the bottles 1 to the transfer position 12.1 in receptacles or grips 24 of the inlet star wheel 12. It is also possible, for example, to realize the grips 24 so that they can be controlled, and so that in the event of a malfunction they can leave the bottles 1 that are moving past the transfer position 12.1 in the receptacles 16 of the transfer star wheel 15, from which the bottles 1 are then forcibly moved outward at the buffer line inlet 21 by appropriate guide means and delivered to the buffer line 20 or its guide system. Other means are also conceivable for the control of the bottle transfer or guidance to the inlet star wheel 12 or past it. The buffer line inlet 21 could be realized in the form of a rigid transfer arm 21a, as shown in FIG. 2B, which could be in a stationary position mounted possible on the buffer line 20, the transfer star wheel 15, or on a separate mounting device. The rigid transfer arm 21a assists in the transfer of bottles 1 from the transfer star wheel 15 to the buffer line 20 by forcibly directing the flow of bottles 1 to the buffer line 20.

The stoppers 22 and 23 and the means for the transfer of the bottles from the transfer star wheel 15 to the inlet star wheel 12 are controlled, for example, by a computer-assisted electronic control and monitoring system 25 that controls and monitors the overall plant and/or the machines 3 and 4.

Figure 2A:
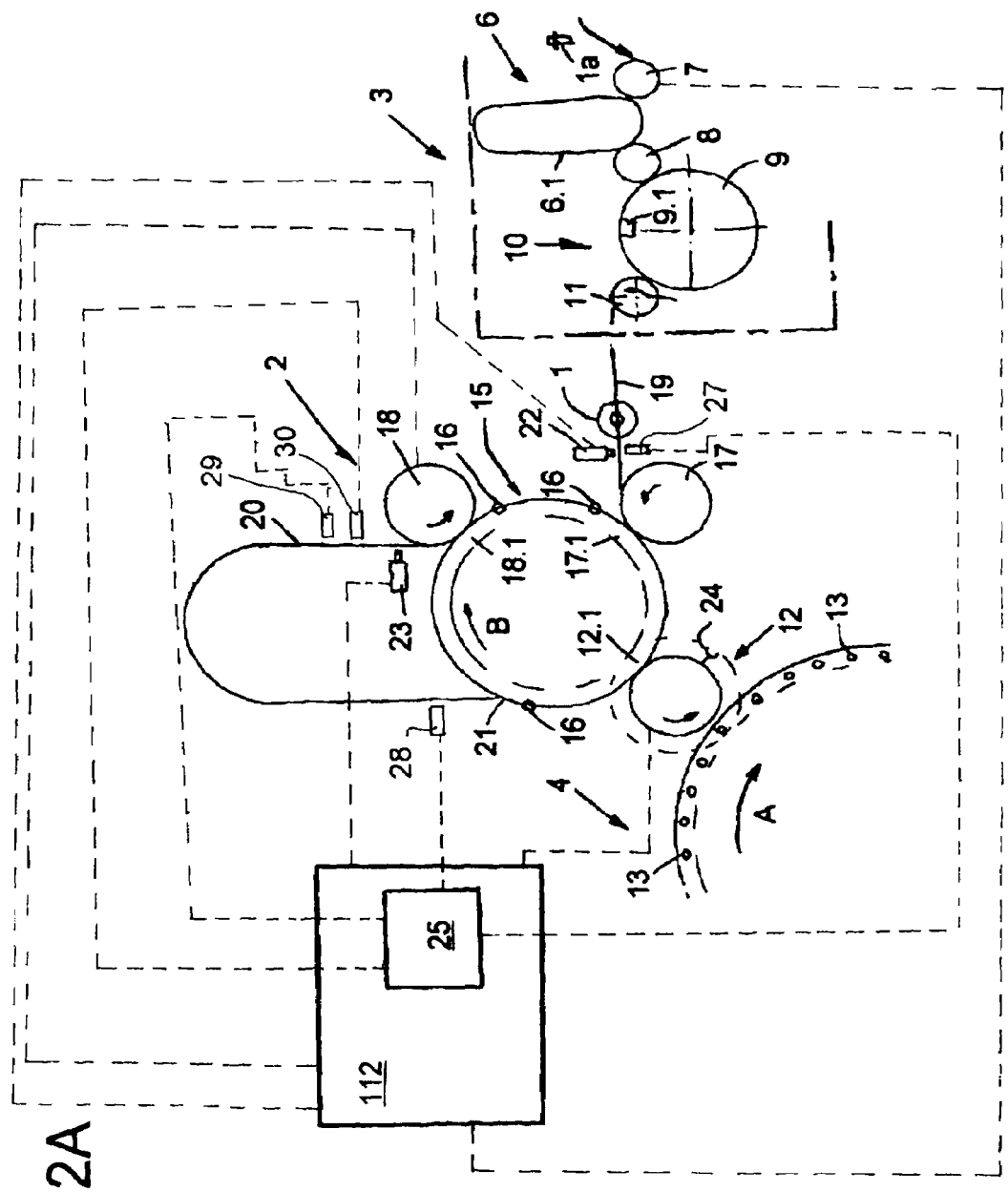
FIG. 2A shows one embodiment of the transport system as illustrated in FIG. 2 with a control system and a monitor system to operate various components.
Figure 2B:
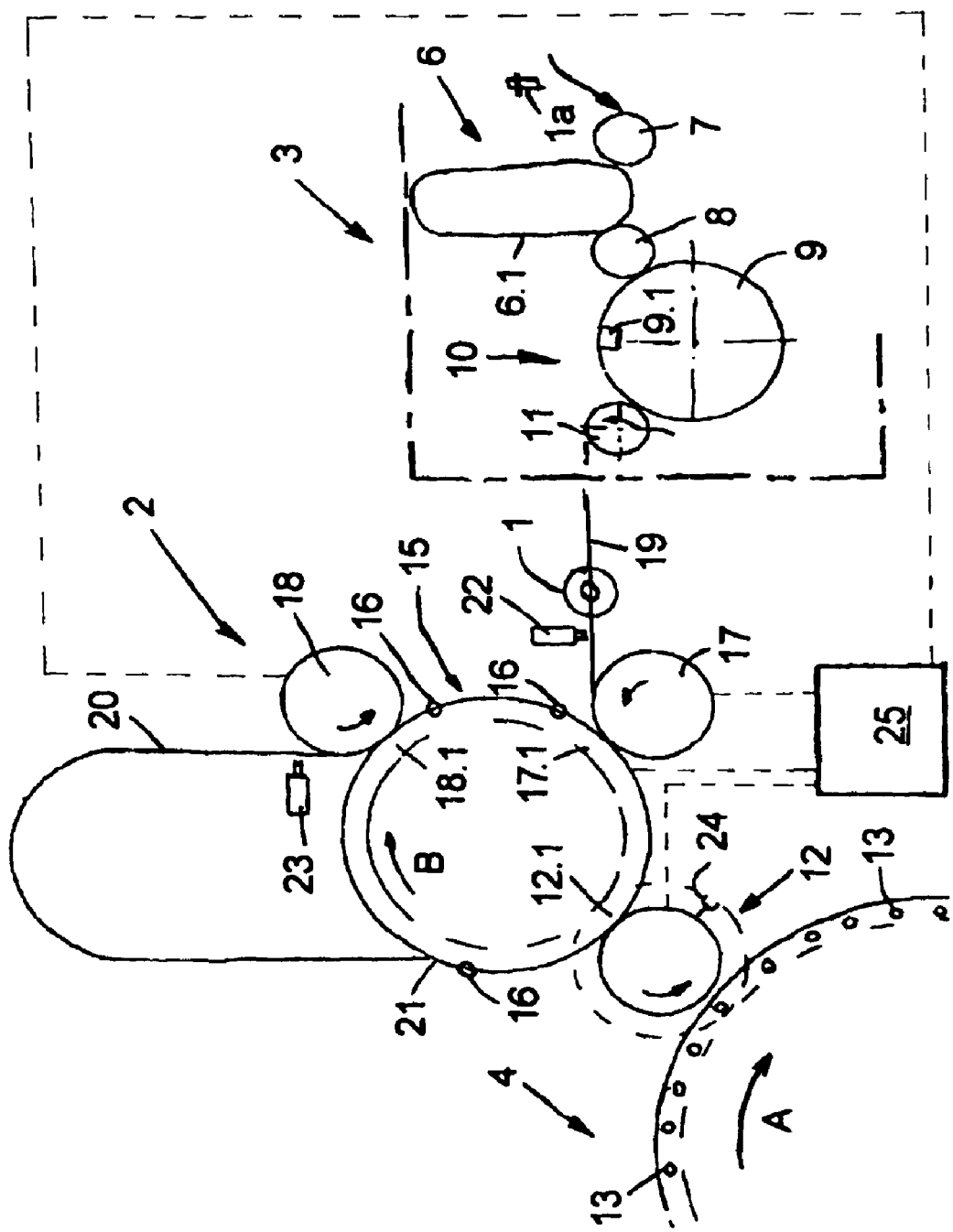
FIG. 2B shows the embodiment of transport system as illustrated in FIG. 2 with a possible sensor arrangement to monitor the starwheels of the transport system 2.

FIG. 2A shows one embodiment of the transport system 2 as illustrated in FIG. 2, with a control system 112 and the monitor system 25 therein or in conjunction therewith in place to monitor the undisrupted or uninterrupted operation or the disrupted operation of the transport system 2 and the undisrupted or uninterrupted operation of the disrupted operation of the blow molding machine 3. The monitoring system 25 is connected to counters 27, 28, and 30 and sensor 29 in order to receive signals and feedback from counters 27, 28, and 30 and sensor 29. However, in other possible embodiments, it may be possible to use one or more counters and more than one sensors. The control system 112 is connected to separation star wheel 18, inlet star wheel 12, and inlet 7 in order to send signals to the separation star wheel 18, inlet star wheel 12, and inlet 7.

In this illustrated embodiment of the present application, the monitoring system 25 works in accordance with and as a part of the control system 112. The monitoring system 25 is designed to receive signals from sensors and counters. A counter 27 could be placed on the transport line 19 to count the number of bottles 1 made by the blow molding machine 3 and conveyed to the separation star wheel 17 and to send a signal to the monitoring system 25 with the number of bottles 1 passing by. A counter 28 could be placed on the buffer line 20, substantially immediately after the buffer line inlet 21, to count the bottles 1 being fed from the transfer star wheel 15 to the buffer line 20 and to send a signal to the monitoring system 25 with the number of bottles 1 passing by. A sensor 29 could be placed on the buffer line 20 relatively near the separation star wheel 18, to send a signal to the monitoring system 25 when the buffer line 20 is emptying the stored bottles 1 back to the transfer star wheel 15. A counter 30 could also be placed on the buffer line 20 relatively near the separation star wheel 18, to count the bottles 1 being fed from the buffer line 20 to the separation star wheel 18 and to send a signal to the monitoring system 25 with the number of bottles 1 passing by. The information sent to the monitoring system 25 is then used by the control system 112 to appropriately control components such as the separation star wheel 18 and inlet star wheel 12.

For example, in undisrupted or uninterrupted operation, stopper 22 is deactivated to allow bottles 1 to pass from the transport line 19 to the separation star wheel 17. The control system 112 allows inlet star wheel 12 to move and use grips or receptacles 24 to move bottles 1 from the transport star wheel onto the inlet star wheel 12 and then move the bottles 1 to the filling machine 4.

If an error were to occur downstream of the transport system 2, for example in the filling machine 4, the control system 112 would stop the feed of preforms 1a to the inlet 7 of the blow molding machine 3, and also stop the inlet star wheel 12 from transferring bottles 1 from receptacles 16 to grips 24 by either stopping the movement of the inlet star wheel 12 or the grips or receptacles 24 from grabbing and transferring bottles 1 to the inlet star wheel 12. The control system 112 would also activate stopper 23 to prevent any bottles 1 to be transferred to the separation star wheel 18. The preforms 1a which are still in the process of being formed in the blow molding machine 3 continue to be blow molded. The formed bottles 1 are transferred from the blow molding machine 3 through the transport system 2 to the buffer line inlet 21. As the bottles 1 enter the buffer line 20, they are counted by counter 28, which relays the information to monitoring system 25. The bottles 1 then move down the buffer line 20 and are stopped by stopper 23. This process continues until the blow molding machine 23 is clear of preforms 1a.

Once the error is resolved and full operation of the beverage plant is ready to begin again, the inlet 7 of the blow molding machine 3 begins feeding preforms 1a to the heating station 6. Stopper 22 is activated to prevent newly formed bottles 1 from passing from the transport line 19 to the separation star wheel 17. Stopper 23 is deactivated to allow bottles 1 to be transferred from the buffer line 20 to the separation star wheel 18 and subsequently to the transfer star wheel 15, inlet star wheel 12, and filling machine 4. The counter 30 counts the number of the bottles 1 passing from the buffer line 20 to the separation star wheel 18. The sensor 29 sends a signal or feedback to the monitoring system 25 when the last bottle 1 is being fed to the separation star wheel 18. When the last bottle 1 is fed from the buffer line 20 to the separation star wheel 18, stopper 22 is deactivated at the appropriate time to allow the newly formed bottles 1 to be fed through separation star wheel 17 and to transfer star wheel 15. When the last bottle 1 is transferred from the separation star wheel 18 and enters into a receptacle 16 of transfer star wheel 15, the first bottle 1 of separation star wheel 17 is positioned to enter the receptacle 16 immediately following the last bottle from separation star wheel 18. In other words, when the last bottle 1 fed from separation star wheel 18 passes transfer position 17.1, a bottle 1 is positioned on separation star wheel 17 to fill the next available receptacle 16. The counters 27, 28, and 30 and sensor 29 and the calculations of monitor system 25 virtually assure that there is neither an excess or absence of bottles 1 in the receptacles 16 of transfer star wheel 15, and subsequently in the grips 24 of inlet star wheel 12 and in the filling positions 13 of the filling machine 4 to prevent spills of the beverage material in the filling machine 4, and also promote an optimum operation of the beverage plant. Software is provided to handle the operation of the beverage plant and to run the described procedures of undisrupted or uninterrupted operation and disrupted operation.

FIG. 2B shows the transport system 2 similar to that illustrated in FIG. 2. In this possible embodiment of the present application, the monitor system 25 is connected to separation starwheel 17, transfer starwheel 15, filling machine inlet starwheel 12, and separation starwheel 18. Separation starwheel 17, transfer starwheel 15, filling machine inlet starwheel 12, and separation starwheel 18 are equipped with sensors that provide feedback to the monitoring system 25. Upon an interruption in the bottling process, a sensor on one starwheel sends signals to the monitoring system 25 relating to the number of degrees that starwheel turns in order to transfer all of the bottles 1 in that transfer starwheel to the next component of transport system 2. For example, upon an interruption in the bottling process, a sensor on separation starwheel 17 sends signals to the monitoring system 25 relating to the number of degrees separation starwheel 17 turns in order to transfer all of the bottles 1 in the separation starwheel 17 to the transfer starwheel 15. Upon an interruption in the bottling process, both the separation starwheel 17 and transfer starwheel 15 use sensors to convey information about the number of bottles 1 in the transport system 2 to the monitoring system 25. This allows the monitoring system 25 to determine how many bottles 1 have entered the buffer line 20. Upon a resolution of an error and resumption of the bottling process, the monitoring system 25 then receives signals from the separation starwheel 18 relating to the number of degrees the separation starwheel 18 is rotating. This allows the monitoring system 25 to determine how many bottles 1 are being transferred back to the transfer starwheel 15 and to determine when to begin transferring newly formed bottles 1 to the transfer starwheel 15 from the separation starwheel 17.

Figure 2C:
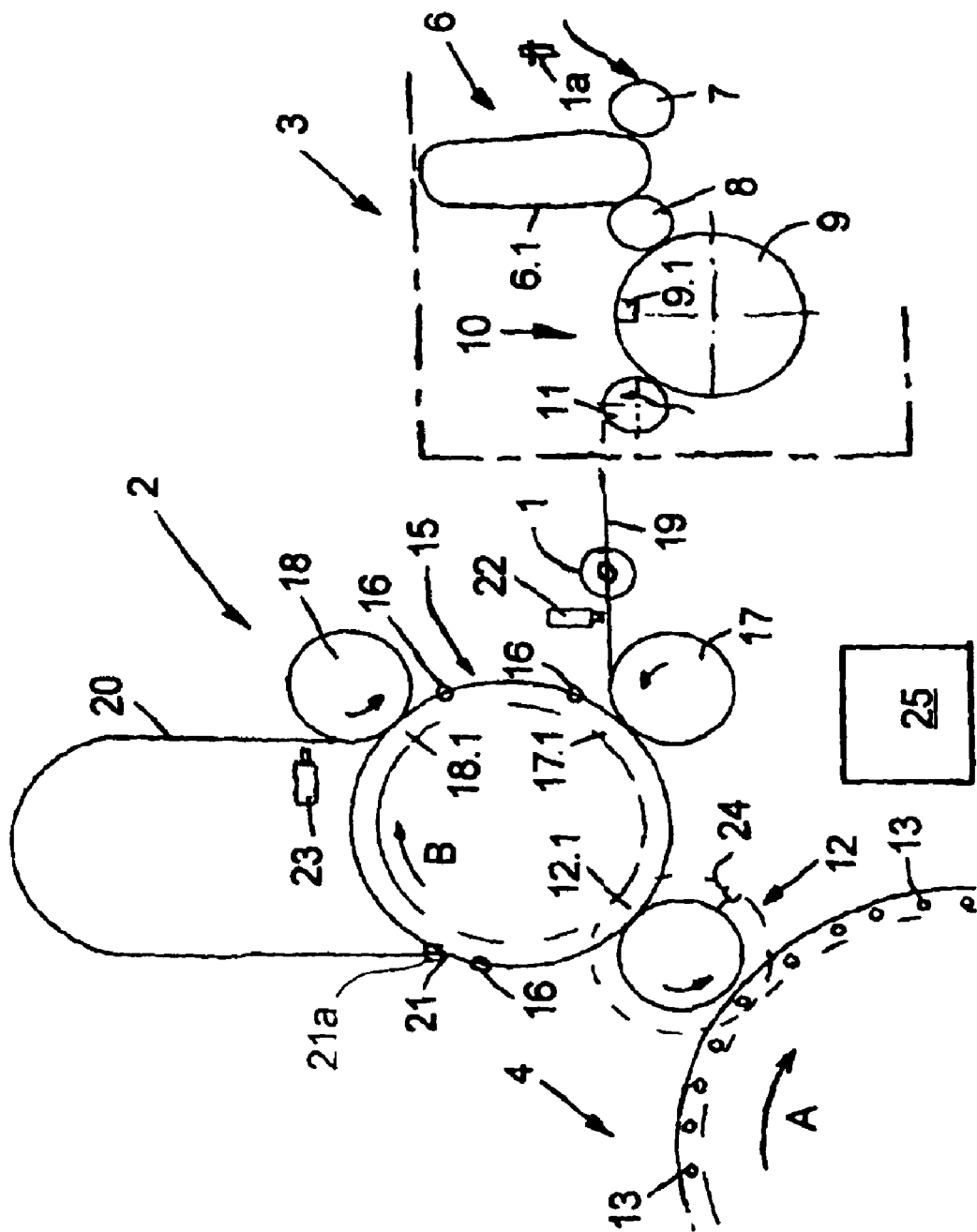
FIG. 2C shows the embodiment of the transport system as illustrated in FIG. 2 with a rigid transfer arm.

FIG. 2C shows the transport system 2 as illustrated in FIG. 2. The buffer line inlet 21 is realized in the form of a rigid transfer arm 21a, which could be in a stationary position mounted possible on the buffer line 20, the transfer star wheel 15, or on a separate mounting device. The rigid transfer arm 21a assists in the transfer of bottles 1 from the transfer star wheel 15 to the buffer line 20 by forcibly directing the flow of bottles 1 to the buffer line 20. FIG. 2b also shows bottle 1, preform 1a, blow molding machine 3, filling machine 4, heater station 6, inlet 7, outlet 8, rotor or blow molding unit 9, blow mold 9.1, blowing station 10, discharge 11, inlet star wheel 12, transfer position 12.1, filling positions 13, transfer star wheel 15, receptacles 16, separation star wheels 17 and 18, transfer positions 12.1, 15.1, 17.1, and 18.1, transport line 19, buffer line 20, stoppers 22 and 23, grips or receptacles 24, monitor system 25, and directions of rotation A and B.

Figure 3:
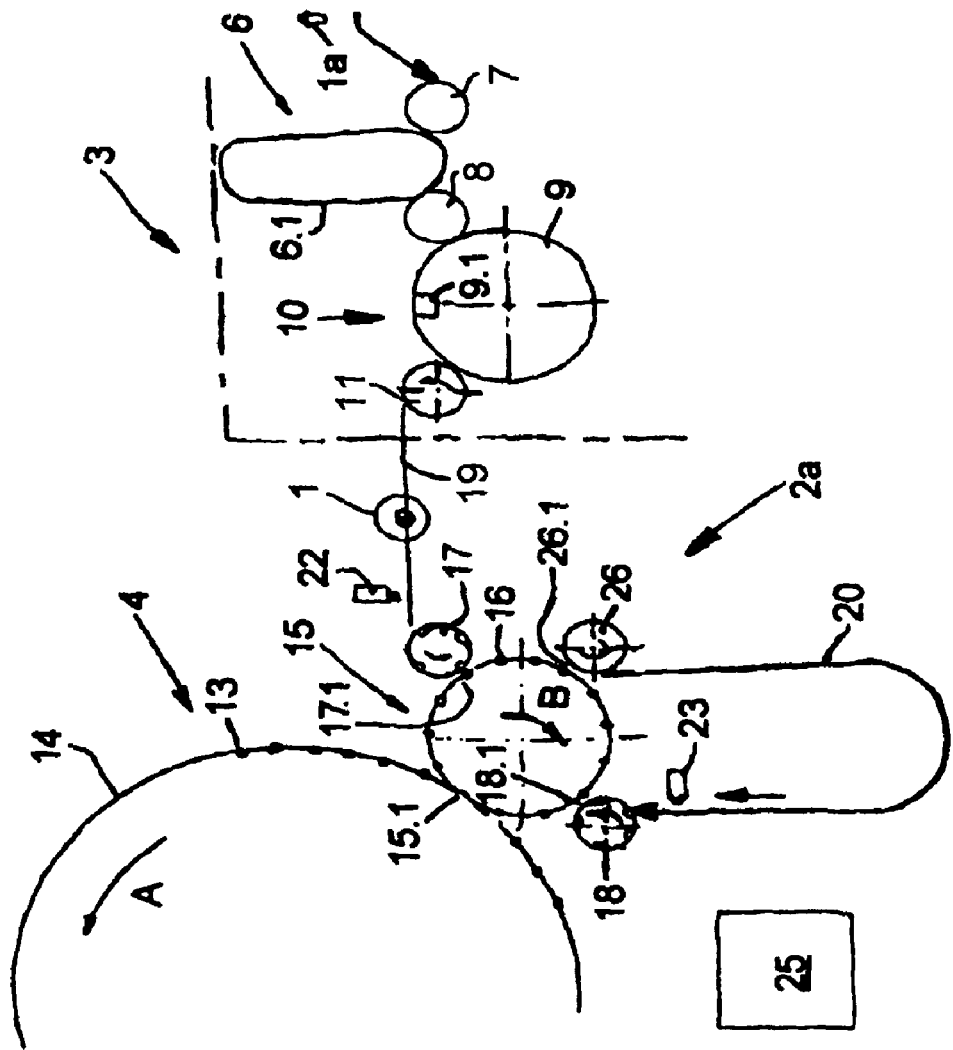
FIG. 3 is a schematic figure that shows another embodiment of a transport system for containers between two machines as illustrated in FIG. 1 in a plan view.

FIG. 3 shows, as an additional embodiment, a transport system 2a which differs from the transport system 2 essentially in that the transfer star wheel 15 simultaneously or substantially simultaneously forms the inlet of the filling machine 4 and of the rotor 14 that has the filling positions 13, as a result of which the inlet star wheel 12 may be omitted. Associated with the transfer star wheel 15 in turn are the separation star wheel 17 at the end of the transport line 19 and the separation star wheel 18 at the end of the buffer line 20.

Also associated with the transfer star wheel 15 is a discharge star wheel 26 which forms the buffer line inlet and which can be controlled, for example, by the electronic control and monitoring system 25 so that by means of the discharge star wheel 26, in the event of a stoppage or a malfunction of the filling machine 4, the bottles 1 can be transported out of the transfer star wheel 15 into the buffer line 20. The equipment is also arranged so that in the direction of rotation B of the transfer star wheel 15, the transfer position 17.1 between the separation star wheel 17 and the transfer star wheel 15 is followed by the transfer position 18.1 between the separation star wheel 18 and the transfer star wheel 15, the transfer position 18.1 is followed by the transfer position 26.1 between the transfer star wheel 26 and the transfer star wheel 15, and the transfer position 26.1 is followed by the transfer position 15.1 between the transfer star wheel 15 and the rotor 14 or the filling positions 13 located on it. In turn, the controllable stoppers 22 and 23 are provide on the transport line 19 and on the buffer line respectively.

During operation with no stoppages or malfunctions, the bottles 1 in the transport system 2a are conveyed via the transport line 19 and the transfer star wheel 15 to the filling positions 13 of the rotor 14 of the filling machine 4. In the event of a stoppage or a malfunction of the filling machine 4, the bottles 1 are conducted, at least until the blow molding machine 3 has been cleared, via the transport line 19, the separation star wheel 17, the transfer star wheel 15 and the discharge star wheel 26 which has been activated for the removal of the bottles 1 from the receptacles 16 of the transfer star wheel 15 into the buffer line 20. After the restart of the filling machine 4 and after the repair of a malfunction, the bottles 1 are fed from the buffer line 20 via the separation star wheel 17 and the transfer star wheel 15 to the filling machine 4 or into filling positions 13 on the rotor 14.

Both systems 2 and 2a therefore have the advantage that bottles that are manufactured during a stoppage or a malfunction of the filling machine 4 are not rejected, but are re-used after the malfunction has been repaired. Both systems 2 and 2a further have the advantage that after the repair of a malfunction, bottles 1 are ready in the buffer line 20 so that the filling process can be continued without any delay when the filling machine 4 restarts or after the repair of a malfunction.

FIG. 3A shows one possible embodiment of the transport system 2a as illustrated in FIG. 3, with a control system 112 with the monitor system 25 therein or in conjunction therewith in place to monitor the undisrupted or uninterrupted operation or the disrupted operation of the transport system 2a and the undisrupted or uninterrupted operation or the disrupted operation of blow molding machine 3. The monitoring system 25 is connected to counters 27, 28, and 30 and sensor 29 in order to receive signals and feedback from counters 27, 28, and 30 and sensor 29. However, in other possible embodiments, it may be possible to use one or more counters and more than one sensors. The control system 112 is connected to the separation star wheel 18, discharge star wheel 26, and inlet 7 in order to send signals to the separation star wheel 18, discharge star wheel 26, and inlet 7.

In this illustrated embodiment of the present application, the monitoring system works in accordance with and as a part of the control system 112. The monitoring system is designed to receive signals from sensors and counters. A counter 27 could be placed on the transport line 19 to count the number of bottles 1 made by the blow molding machine 3 and conveyed to the separation star wheel 17 and to send a signal to the monitoring system 25 with the number of bottles 1 passing by. A counter 28 could be placed on the buffer line 20, substantially immediately after the discharge star wheel 26, to count the bottles 1 being fed from the transfer star wheel 15 to the buffer line 20 and to send a signal to the monitoring system 25 with the number of bottles 1 passing by. A sensor 29 could be placed on the buffer line 20 relatively near the separation star wheel 18, to send a signal to the monitoring system 25 when the buffer line 20 is emptying stored bottles 1 back to the transfer star wheel 15. A counter 30 could also be placed on the buffer line 20 relatively near the separation star wheel 18, to count the bottles 1 being fed from the buffer line 20 to the separation star wheel 18 and to send a signal to the monitoring system 25 with the number of bottles 1 passing by. The information send to the monitoring system 25 is then used by the control system 112 to appropriately control components such as the discharge star wheel 26 and separation star wheel 18.

For example, in undisrupted or uninterrupted operation, stopper 22 is deactivated to allow bottles 1 to pass from the transport line 19 to the separation star wheel 17. The control system 112 allows the bottles 1 to move by the discharge star wheel 26 without transferring the bottles 1 to the discharge star wheel 26, thereby allowing the bottles 1 to be transferred to the filling machine 4.

If an error were to occur downstream of the transport system 2a, for example in filling machine 4, the control system 112 would stop the feed of preforms 1a to the inlet 7 of the blow molding machine 3, and also begin the transfer of bottles 1 to the discharge star wheel 26 from transfer star wheel 15. The control system 112 would also activate stopper 23 to prevent any bottles 1 from being transferred to the separation star wheel 18. The preforms 1a which are still in the process of being formed in the blow molding machine 3 continue to be blow molded. The formed bottles 1 are transferred from the blow molding machine 3 through the transport system 2a to the discharge star wheel 26. As the bottles 1 enter the buffer line 20, the bottles 1 are counted by counter 28, which relays the information to the monitoring system 25. The bottles 1 then move down the buffer line 20 and are stopped by stopper 23. This process continues until the blow molding machine 23 is clear of the preforms 1a.

Once the error is resolved and full operation of the beverage plant is ready to begin again, the inlet 7 of the blow molding machine 3 begins feeding preforms 1a to the heating station 6. Stopper 22 is activated to prevent newly formed bottles 1 from passing from the transport line 19 to the separation star wheel 17. Stopper 23 is deactivated to allow bottles 1 to be transferred from the buffer line 20 to the separation star wheel 18 and subsequently to the transfer star wheel 15 and filling machine 4. The counter 30 counts the number of the bottles 1 passing from the buffer line 20 to the separation star wheel 18. The sensor 29 sends a signal or feedback to the monitoring system 25 when the last bottles 1 is being fed to the separation star wheel 18. When the last bottle 1 is fed from the buffer line 20 to the separation star wheel 18, stopper 22 and discharge star wheel 26 are deactivated at the appropriate time to allow the newly formed bottles 1 to be fed through separation star wheel 17 and to transfer star wheel 15 so that when the last bottle 1 from the separation star wheel 18 enters into a receptacle 16 of transfer star wheel 15, the first bottle 1 of separation star wheel 17 is positioned to enter the receptacle 16 immediately or essentially immediately following the last bottle from separation star wheel 18. The counters 27, 28, and 30 and sensor 29 and the calculations from monitor system 25 virtually assure that there is neither an excess or absence of bottles 1 in the receptacles 16 of transfer star wheel 15, and subsequently in the filling machine 4 to prevent spills of the beverage material in the filling machine 4, and also promote an optimum operation of the beverage plant. Software is provided to handle the operation of the beverage plant and to run the described procedures of undisrupted or uninterrupted operation and disrupted operation.

Figure 3B:
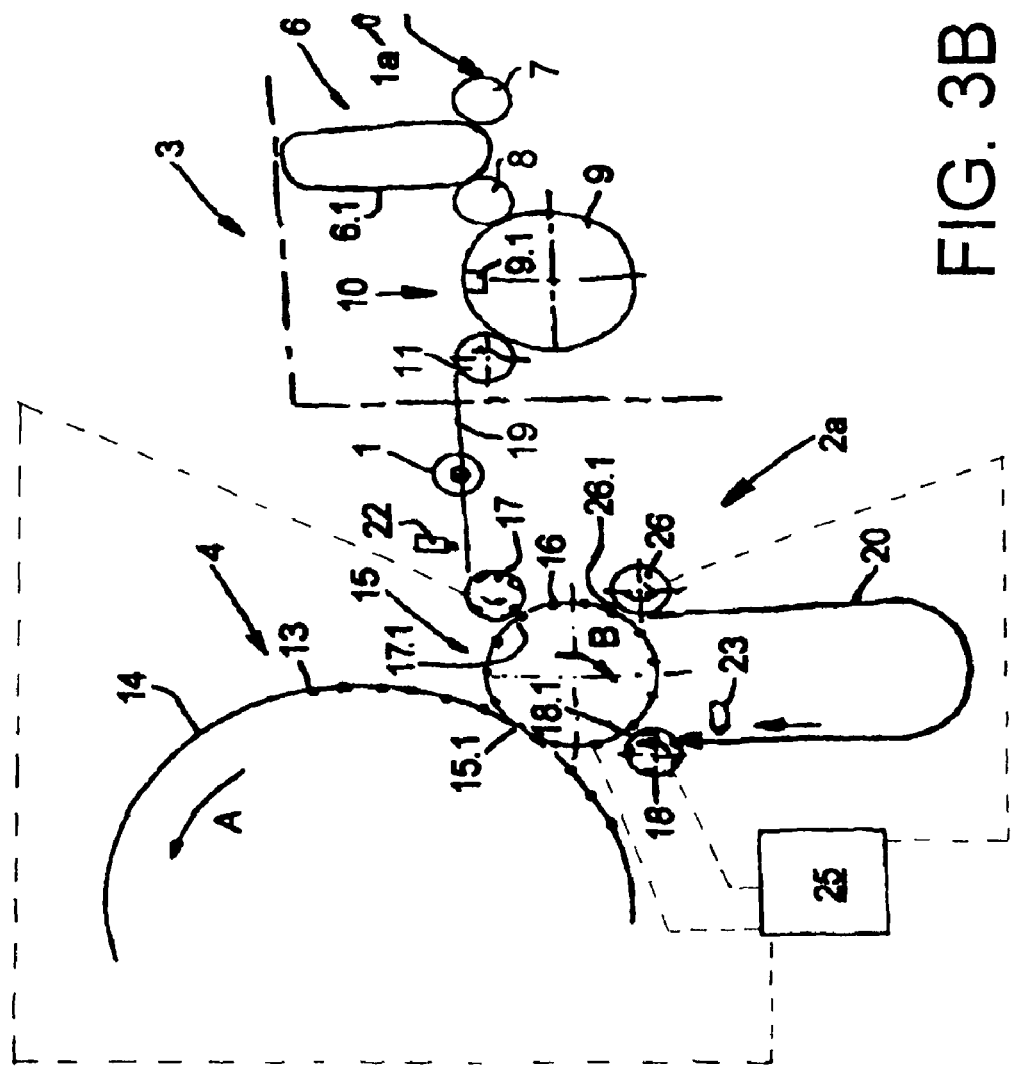

FIG. 3B shows the transport system 2a similar to that illustrated in FIG. 3. In this possible embodiment of the present application, the monitor system 25 is connected to separation starwheel 17, transfer starwheel 15, discharge starwheel 26, and separation starwheel 18. Separation starwheel 17, transfer starwheel 15, discharge starwheel 26, and separation starwheel 18 are equipped with sensors that provide feedback to the monitoring system 25. Upon an interruption in the bottling process, a sensor on one starwheel sends signals to the monitoring system 25 relating to the number of degrees that starwheel turns in order to transfer all of the bottles 1 in that transfer starwheel to the next component in the transfer system 2a. For example, upon an interruption in the bottling process, a sensor on separation starwheel 17 sends signals to the monitoring system 25 relating to the number of degrees separation starwheel 17 turns in order to transfer all of the bottles 1 in the separation starwheel 17 to the transfer starwheel 15. Upon an interruption in the bottling process, the separation starwheel 17, transfer starwheel 15, and discharge starwheel 26 use sensors to convey information about the number of bottles 1 in the transport system 2a to the monitoring system 25. This allows the monitoring system 25 to determine how many bottles 1 have entered the buffer line 20. Upon a resolution of an error and resumption of the bottling process, the monitoring system 25 then receives signals from the separation starwheel 18 relating to the number of degrees the separation starwheel 18 is rotating. This allows the monitoring system 25 to determine how many bottles 1 are being transferred back to the transfer starwheel 15 and to determine when to begin transferring newly formed bottles 1 to the transfer starwheel 15 from the separation starwheel 17.

Figure 4:
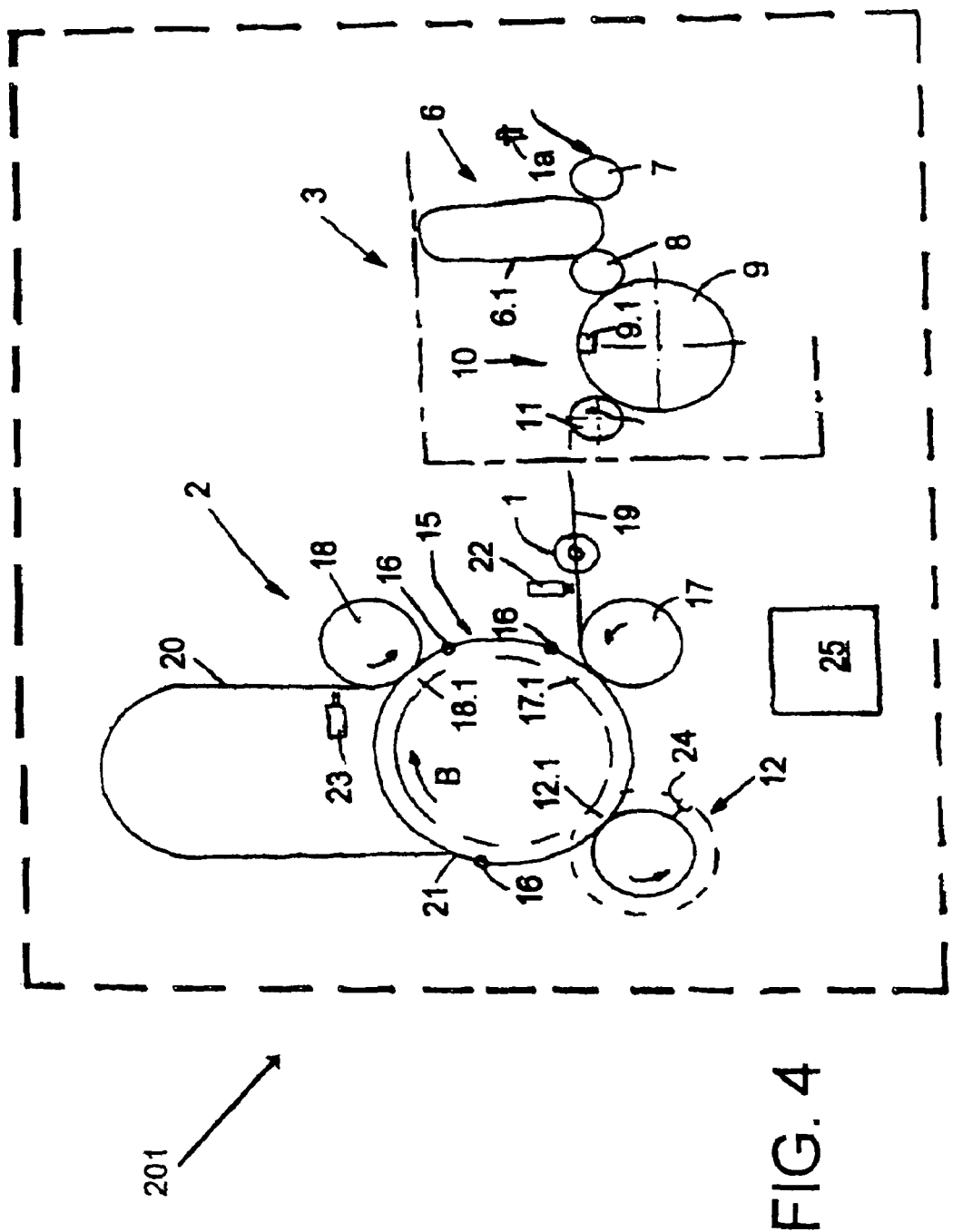
FIG. 4 shows the blow molding machine and transport system of the embodiment of FIG. 2.

FIG. 4 shows the blow molding and transfer component 201 of the possible embodiment illustrated in FIG. 2. The blow molding and transfer component 201 comprises the blow molding machine 3, inlet 7, heater station 6, transport element 6.1, outlet 8, rotor or blow-molding unit 9, blowing station 10, discharge 11, transport system 2, transport line 19, transfer starwheel 15, receptacles 16, separation starwheels 17 and 18, transfer positions 17.1 and 18.1, inlet starwheel 12, receptacle position 12.1, buffer line 20, buffer line inlet 21, inlet grips or receptacles 24, stoppers 22 and 23, monitoring system 25 and direction of rotation of the transfer starwheel B.

Figure 5:
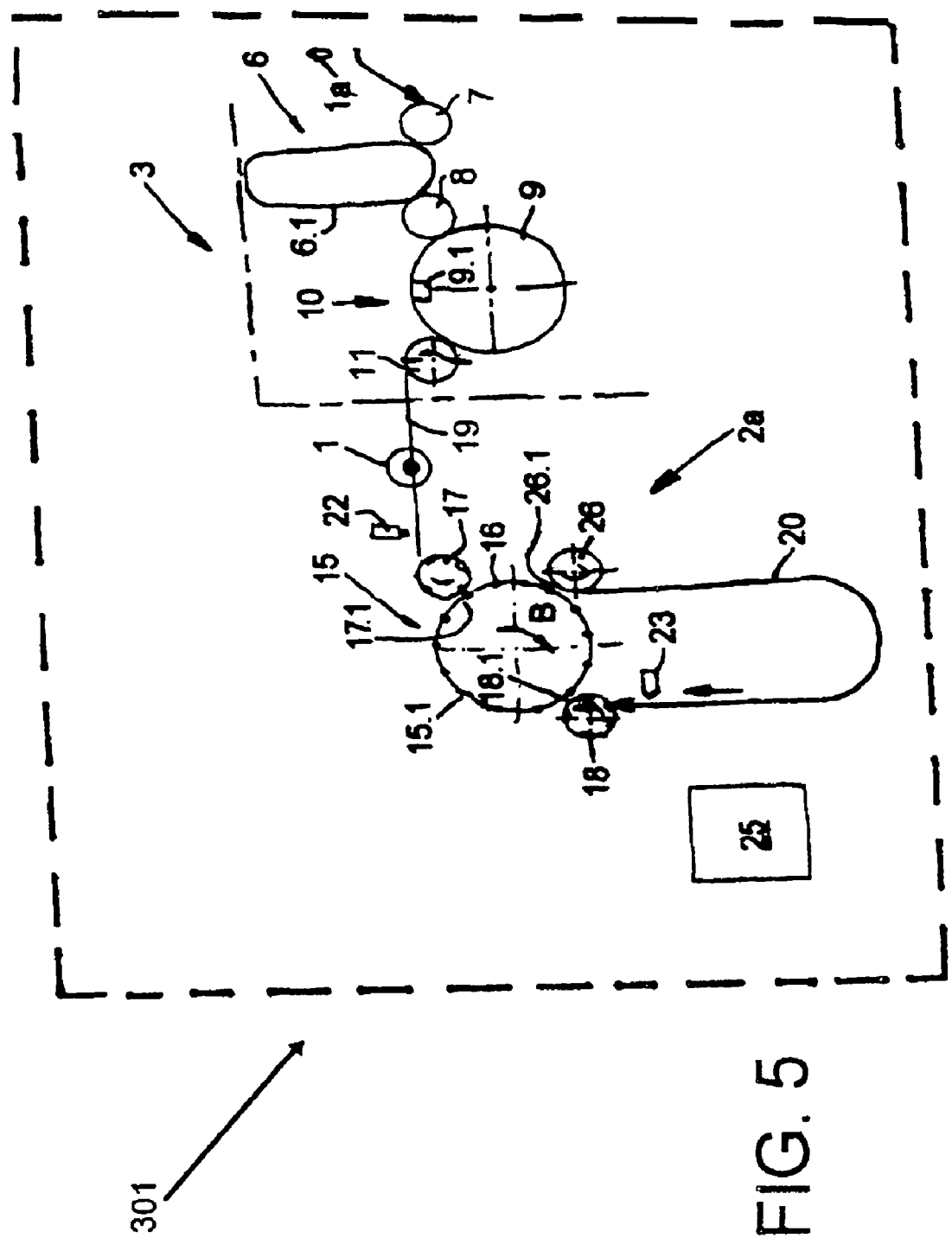
FIG. 5 shows the blow molding machine and transport system of the embodiment of FIG. 3.

FIG. 5 shows the blow molding and transfer component 301 of the possible embodiment illustrated in FIG. 3. The blow molding and transfer component 301 comprises the blow molding machine 3, inlet 7, heater station 6, transport element 6.1, outlet 8, rotor or blow-molding unit 9, blowing station 10, discharge 11, transport system 2a, transport line 19, transfer starwheel 15, receptacles 16, separation starwheels 17 and 18, transfer positions 17.1 and 18.1, discharge starwheel 26, transfer position 26.1, buffer line 20, stoppers 22 and 23, monitoring system 25, and direction of rotation of the transfer starwheel B.

Figure 6:
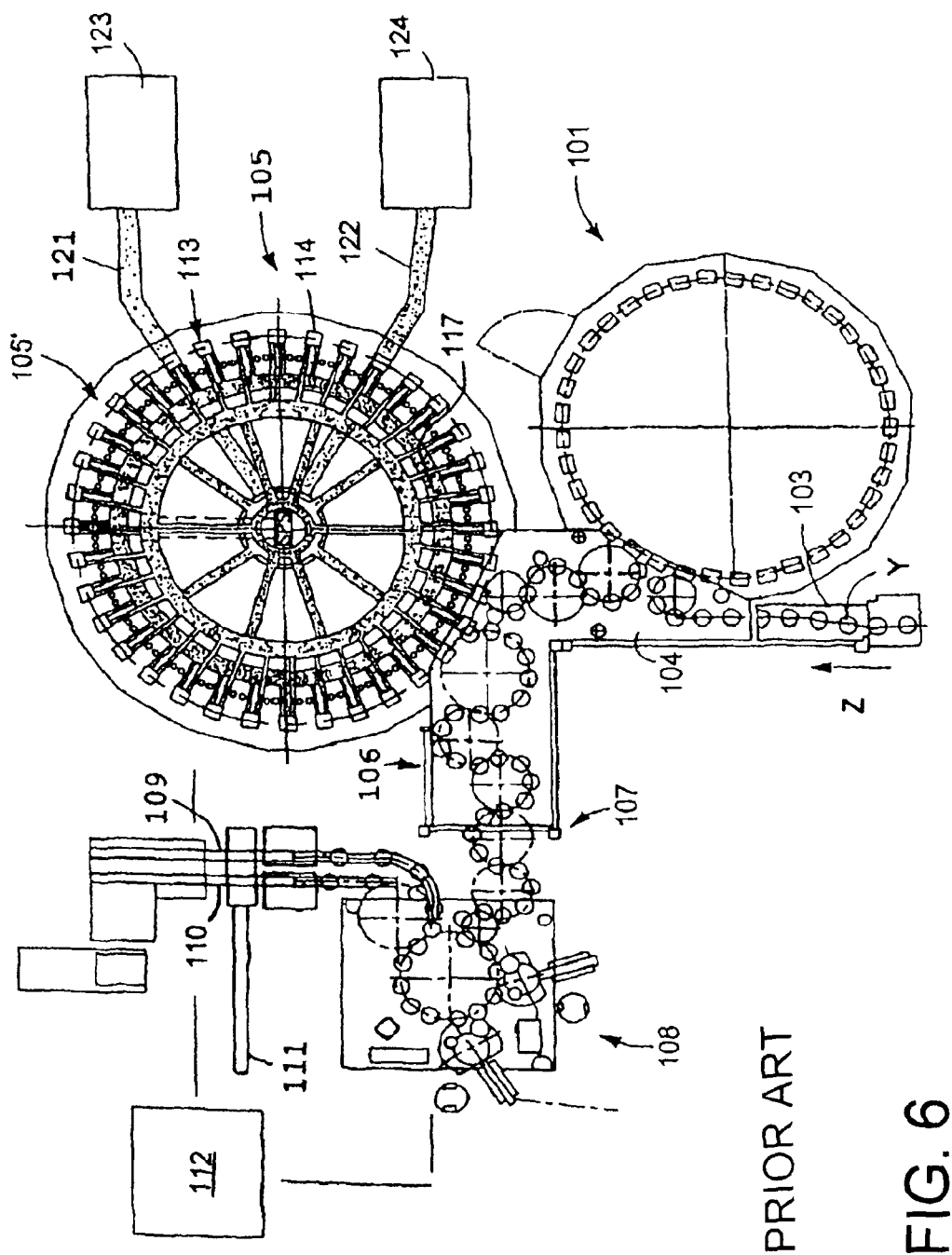
FIG. 6 shows schematically the main components of one possible embodiment example of a system for filling containers, in accordance with at least one possible embodiment.

FIG. 6 shows schematically the main components of one possible embodiment example of a system for filling containers, specifically, a beverage bottling plant for filling bottles with at least one liquid beverage, in accordance with at least one possible embodiment, in which system or plant could possibly be utilized at least one aspect, or several aspects, of the embodiments disclosed herein.

FIG. 6 shows a rinsing arrangement or rinsing station 101, to which the containers, namely bottles Y, are fed in the direction of travel as indicated by the arrow Z, by a first conveyer arrangement 103, which can be a linear conveyor or a combination of a linear conveyor and a starwheel. Downstream of the rinsing arrangement or rinsing station 101, in the direction of travel as indicated by the arrow Z, the rinsed bottles Y are transported to a beverage filling machine 105 by a second conveyer arrangement 104 that is formed, for example, by one or more starwheels that introduce bottles Y into the beverage filling machine 105.

The beverage filling machine 105 shown is of a revolving or rotary design, with a rotor 105', which revolves around a central, vertical machine axis. The rotor 105' is designed to receive and hold the bottles Y for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles Y to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 6, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle Y, the first product or the second product can be filled by means of an appropriate control of the filling product or fluid valves.

Downstream of the beverage filling machine 105, in the direction of travel of the bottles Y, there can be a beverage bottle closing arrangement or closing station 106 which closes or caps the bottles Y. The beverage bottle closing arrangement or closing station 106 can be connected by a third conveyer arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles Y. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles Y to different locations.

The first output conveyer arrangement 109, in the embodiment shown, is designed to convey bottles Y that are filled with a first type of liquid beverage supplied by, for example, the supply reservoir 123. The second output conveyer arrangement 110, in the embodiment shown, is designed to convey bottles Y that are filled with a second type of liquid beverage supplied by, for example, the supply reservoir 124. The third output conveyer arrangement 111, in the embodiment shown, is designed to convey incorrectly labeled bottles Y. To further explain, the labeling arrangement 108 can comprise at least one beverage bottle inspection or monitoring device that inspects or monitors the location of labels on the bottles Y to determine if the labels have been correctly placed or aligned on the bottles Y. The third output conveyer arrangement 111 removes any bottles Y which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

Figure 7:
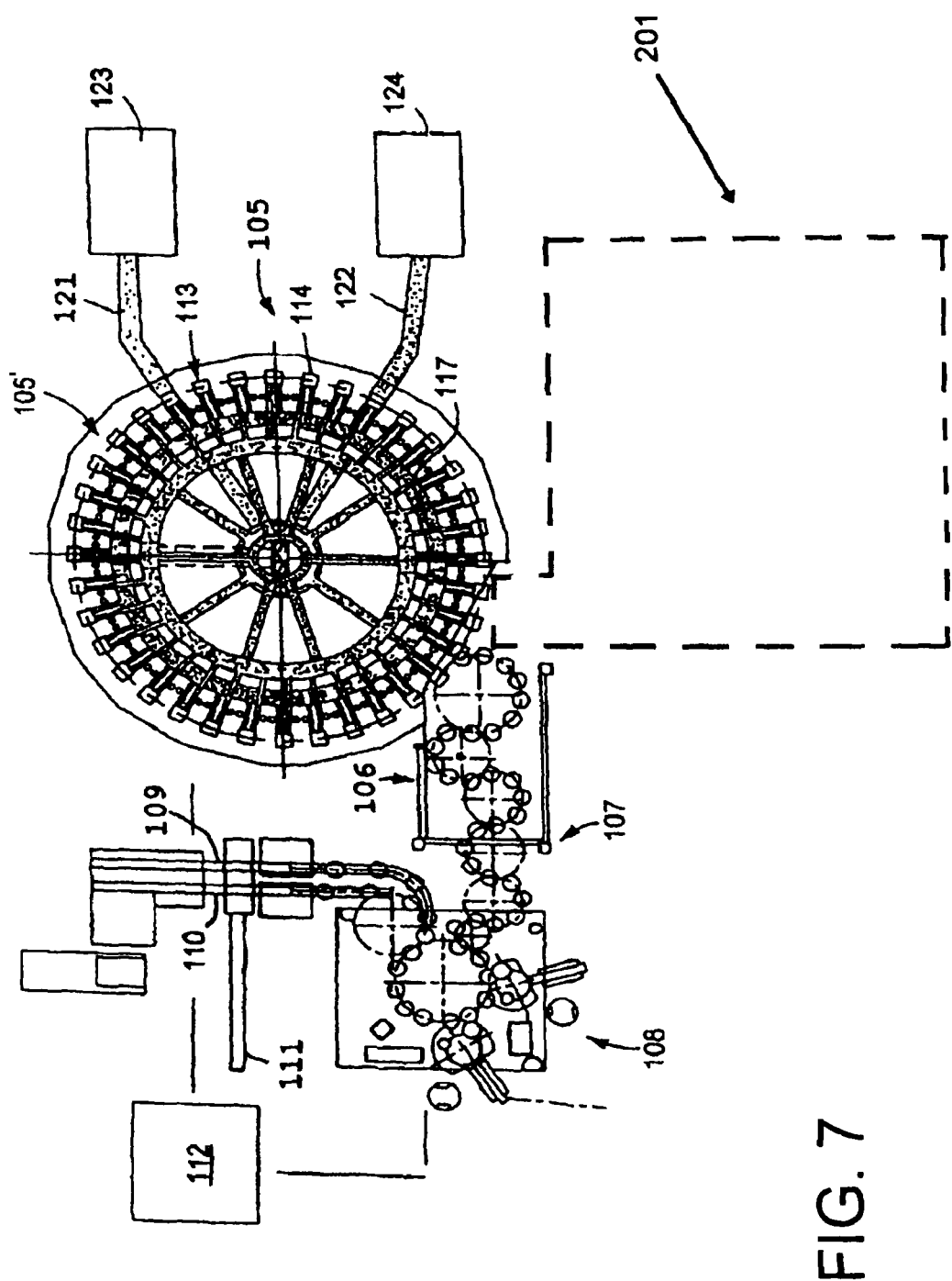
FIG. 7 shows one possible embodiment example of a system for filling containers using the blow molding machine and transport system of the embodiment shown in FIG. 4.

FIG. 7 shows the main components of a beverage bottling plant utilizing the blow molding and transfer component 201 of the embodiment illustrated in FIG. 4. FIG. 7 shows a blow molding and transfer component 201, a beverage filling machine 105, a rotor 105' which revolves around a central, vertical machine axis, and is designed to receive and hold the bottles for filling at a plurality of filling positions 113 located about the periphery of the rotor 105', a filling arrangement 114 having at least one filling device, element, apparatus, or valve, a toroidal or annular vessel 117, two external supply reservoirs 123 and 124, corresponding supply lines, conduits, or arrangements 121 and 122, a beverage bottle closing arrangement or closing station 106 which closes or caps the bottles, a beverage bottle closing arrangement or closing station 106, a conveyer arrangement 107, a beverage bottle labeling arrangement or labeling station 108, a first output conveyer arrangement 109, a second output conveyer arrangement 110, and a third output conveyer arrangement 111, and a central control arrangement 112, which could be, for example, computerized control system that monitors and controls the operation of the various stations and mechanisms of the beverage bottling plant.

Figure 8:
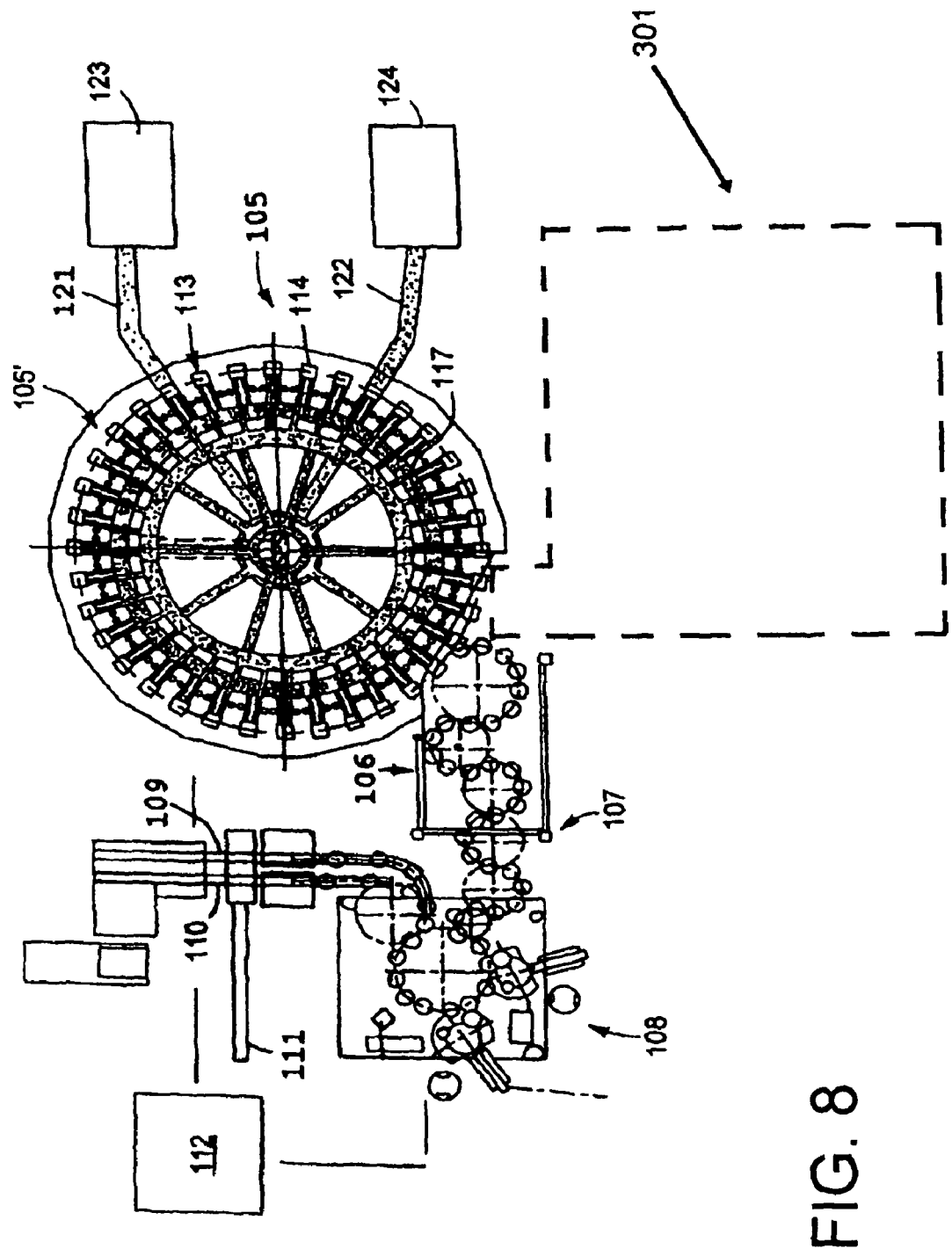
FIG. 8 shows one possible embodiment example of a system for filling containers using the blow molding machine and transport system of the embodiment shown in FIG. 5.

FIG. 8 shows the main components of a beverage bottling plant utilizing the blow molding and transfer component 301 of the embodiment illustrated in FIG. 4. FIG. 8 shows a blow molding and transfer component 301, a beverage filling machine 105, a rotor 105' which revolves around a central, vertical machine axis, and is designed to receive and hold the bottles for filling at a plurality of filling positions 113 located about the periphery of the rotor 105', a filling arrangement 114 having at least one filling device, element, apparatus, or valve, a toroidal or annular vessel 117, two external supply reservoirs 123 and 124, corresponding supply lines, conduits, or arrangements 121 and 122, a beverage bottle closing arrangement or closing station 106 which closes or caps the bottles, a beverage bottle closing arrangement or closing station 106, a conveyer arrangement 107, a beverage bottle labeling arrangement or labeling station 108, a first output conveyer arrangement 109, a second output conveyer arrangement 110, and a third output conveyer arrangement 111, and a central control arrangement 112, which could be, for example, computerized control system that monitors and controls the operation of the various stations and mechanisms of the beverage bottling plant.

The present application was described above on the basis of possible embodiments, although modifications and variations are possible. For example, it is also possible and even provided within the scope of the present application that the transport line 19, which is described in the possible embodiments as an essentially linear air transport line, can be omitted, in which case the outlet of the blow molding machine 11, for example a transport star wheel that forms this outlet, and the separation star wheel 17 can be located directly next to each another or can be connected to each other via one or more known neck handling transport star wheels in the direction of transport.

The following patents, patent applications or patent publications, are hereby incorporated by reference as if set forth in their entirety herein: DE 198 24 846 A1, published on Dec. 9, 1999, with the English translation of the title "COMBINED PLANT FOR BLOWING, FILLING AND LABELLING PLASTIC DRINKS BOTTLES WITH A STORAGE UNIT FOR STORING EXCESS BOTTLES;" and U.S. Pat. No. 7,200,975, published on Apr. 10, 2007, with the title "BEVERAGE BOTTLING PLANT FOR FILLING BOTTLES WITH A LIQUID BEVERAGE FILLING MATERIAL, HAVING A TRANSFER DEVICE FOR THE TRANSFER OF CONTAINERS FROM A TRANSFER STARWHEEL TO THE CAROUSEL OF A CONTAINER HANDLING MACHINE."

The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

U.S. patent application Ser. No. 11/690,624, filed on Mar. 23, 2007, having inventor Volker TILL, and title "BEVERAGE BOTTLING OR CONTAINER FILLING PLANT HAVING A BEVERAGE BOTTLE OR CONTAINER HANDLING MACHINE AND A METHOD OF OPERATION THEREOF", and its corresponding Federal Republic of Germany Patent Application No. 10 2006 013 843.0-16, filed on Mar. 25, 2006, are hereby incorporated by reference as if set forth in their entirety herein.

The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

Some examples of cameras or the like optical monitoring apparatus that may possibly be utilized or possibly adapted for use in at least one possible embodiment of the present application may possibly be found in the following U.S. Pat. No. 5,233,186 issued to Ringlien on Aug. 3, 1993; No. 5,243,400 issued to Ringlien on Sep. 7, 1993; No. 5,369,713 issued to Schwartz et al. on Nov. 29, 1994; No. 5,442,446 issued to Gerber et al. on Aug. 15, 1995; No. 5,661,295 issued to Buchmann et al. on Aug. 26, 1997; and No. 5,898,169 issued to Nodbryhn on Apr. 27, 1999.

The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

Some examples of starwheels which may possibly be utilized or adapted for use in at least one possible embodiment may possibly be found in the following U.S. Pat. No. 5,613,593, entitled "Container handling starwheel;" No. 5,029,695, entitled "Improved starwheel;" No. 4,124,112, entitled "Odd-shaped container indexing starwheel;" and No. 4,084,686, entitled "Starwheel control in a system for conveying containers."

The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

Some examples of blow molding machines, which may be used or adapted for use in at least one possible embodiment of the present application, may be found in the following U.S. Pat. No. 7,396,225, issued Jul. 8, 2008, with the title "DEVICE FOR BLOW MOULDING, FILLING AND CLOSING PLASTIC CONTAINERS;" No. 7,393,495, issued Jul. 1, 2008, with the title "METHODS AND APPARATUSES FOR THE FORMATION OF BLOW MOLDED OBJECTS;" and No. 7,390,187, issued Jun. 24, 2008, with the title "BLOW MOLDING APPARATUS HAVING RAISED PINCHES AND COMPRESSION LANDS."

The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

Some examples of cameras or the like optical monitoring apparatus that may possibly be utilized or possibly adapted for use in at least one possible embodiment of the present application may possibly be found in the following U.S. Pat. No. 5,233,186 issued to Ringlien on Aug. 3, 1993; No. 5,243,400 issued to Ringlien on Sep. 7, 1993; No. 5,369,713 issued to Schwartz et al. on Nov. 29, 1994; No. 5,442,446 issued to Gerber et al. on Aug. 15, 1995; No. 5,661,295 issued to Buchmann et al. on Aug. 26, 1997; and No. 5,898,169 issued to Nodbryhn on Apr. 27, 1999.

The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

Some examples of methods and apparatuses for closing bottles and containers and their components that may possibly be utilized or possibly adapted for use in at least one possible embodiment of the present application may possibly be found in the following U.S. Pat. No. 5,398,485 issued to Osifchin on Mar. 21, 1995; No. 5,402,623 issued to Ahlers on Apr. 4, 1995; No. 5,419,094 issued to Vander Bush, Jr. et al. on May 30, 1995; No. 5,425,402 issued to Pringle on Jun. 20, 1995; No. 5,447,246 issued to Finke on Sep. 5, 1995; and No. 5,449,080 issued to Finke on Sep. 12, 1995.

The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

Some examples of control systems which measure operating parameters and learn therefrom that may possibly be utilized or possibly adapted for use in at least one possible embodiment of the present application may possibly be found in the following U.S. Pat. No. 4,655,188 issued to Tomisawa et al. on Apr. 7, 1987; No. 5,191,272 issued to Torii et al. on Mar. 2, 1993; No. 5,223,820, issued to Sutterlin et al. on Jun. 29, 1993; and No. 5,770,934 issued to Theile on Jun. 23, 1998.

Some examples of control systems which measure operating parameters and learn therefrom that may possibly be utilized or possibly adapted for use in at least one possible embodiment of the present application may possibly be found in the following U.S. Pat. No. 4,655,188 issued to Tomisawa et al. on Apr. 7, 1987; No. 5,191,272 issued to Torii et al. on Mar. 2, 1993; No. 5,223,820, issued to Sutterlin et al. on Jun. 29, 1993; and No. 5,770,934 issued to Theile on Jun. 23, 1998.

One feature or aspect of an embodiment is believed at the time of the filing of this patent application to possibly reside broadly in a transport system for the transport of bottles or similar containers 1 between at least one first machine 3, for example a blow molding machine for the manufacture of the containers 1 from plastic, and at least one second machine 4, for example a filling machine, with at least one transport element 15 that can be driven in rotation with a plurality of container receptacles 16 which are moved with the transport element 15 past a plurality of transfer positions 12.1, 17.1, 18.1, 21, 26. that are arranged one after another in a transport element circulation or transport direction B, at least one transfer position 17.1 of which is used for the feed of the containers 1 from the first machine 3 to the transport element 15 and a transfer position 12.1, 26.1 for the forwarding of the containers 1 to the second machine 4, wherein of two different transfer positions, one of the transfer positions 21, 26.1 is used to advance the containers 1 to at least one buffer line 20 and one transfer position 18.1 is used to advance the containers 1 from the buffer line 20 to the transport element 15.

Another feature or aspect of an embodiment is believed at the time of the filing of this patent application to possibly reside broadly in the transport system, wherein control means for the controlled advance of the containers 1 from the transport element 15 to a transfer position 12.1, 15.1 to the second machine 4 or to a transfer position 21, 26.1 to the at least one buffer line 20.

Yet another feature or aspect of an embodiment is believed at the time of the filing of this patent application to possibly reside broadly in the transport system, wherein the transport element is a transport or transfer star wheel 15 which can be driven in rotation around a vertical axis and which has open container receptacles 16 on the periphery.

Still another feature or aspect of an embodiment is believed at the time of the filing of this patent application to possibly reside broadly in the transport system, wherein at least one transfer position 12.1, 17.1, 18.1, 26.1 is formed by a transport or separation star wheel 12, 17, 18, 26 which interacts with the rotating transport element 15 and has individual receptacles for the respective containers 1.

A further feature or aspect of an embodiment is believed at the time of the filing of this patent application to possibly reside broadly in the transport system, wherein the transport star wheel that forms the transfer position 17.1 is a separation star wheel 17 which is provided on the end of a transport line 19 for the feed of the containers 1.

Another feature or aspect of an embodiment is believed at the time of the filing of this patent application to possibly reside broadly in the transport system, wherein the transport star wheel that forms the transfer position 12.1 is the container inlet star wheel 12 of the second machine.

Yet another feature or aspect of an embodiment is believed at the time of the filing of this patent application to possibly reside broadly in the transport system, wherein the transport star wheel that forms the transfer position 26.1 is a discharge star wheel 26, adjacent to which is the inlet of the at least one buffer line 20 and/or which forms the inlet of the at least one buffer line 20.

Still another feature or aspect of an embodiment is believed at the time of the filing of this patent application to possibly reside broadly in the transport system, wherein the transport star wheel that forms the transfer position 18.1 is a separation star wheel 18 at the outlet of the at least one buffer line 20.

A further feature or aspect of an embodiment is believed at the time of the filing of this patent application to possibly reside broadly in the transport system comprising means 22, 23 for the controlled closing and opening of the container feed to a first transfer position 17.1 and/or to an additional transfer position 18.1.

Another feature or aspect of an embodiment is believed at the time of the filing of this patent application to possibly reside broadly in the transport system, wherein its functional elements are realized, at least to a large extent, for holding and/or guidance of the containers 1 on a container flange or neck flange 1.1.

Yet another feature or aspect of an embodiment is believed at the time of the filing of this patent application to possibly reside broadly in the transport system, wherein the rotating transport element 15 and its container receptacles 16 are realized for holding and/or guidance of the containers 1 on a container flange or neck flange 1.1.

Another feature or aspect of an embodiment is believed at the time of the filing of this patent application to possibly reside broadly in the transport system, wherein when the first machine 3 is realized in the form of a blow molding machine, the transport system can be controlled so that when there is a stoppage or a malfunction in the second machine 4, the containers 1 that are fabricated while the blow molding machine is being cleared are transported via the conveyor element 15 into the buffer line 20.

Yet another feature or aspect of an embodiment is believed at the time of the filing of this patent application to possibly reside broadly in the transport system, wherein the transport system 2, 2a can be controlled so that after the repair of the malfunction in the second machine 4, during the restart of the blow molding machine, first containers 1 are advanced from the buffer line 20 via the transport or transfer element 15 and via a transfer position to the second machine 4.

Still another feature or aspect of an embodiment is believed at the time of the filing of this patent application to possibly reside broadly in the transport system, wherein the transport or transfer element 15 is immediately or essentially immediately adjacent to the second machine 4 at a transfer position 15.1.

Another feature or aspect of an embodiment is believed at the time of the filing of this patent application to possibly reside broadly in the transport system, wherein the transfer positions 12.1, 17.1, 18.1, 26.1 are provided at equal or approximately equal intervals on the path of movement of the container receptacles 16.

Yet another feature or aspect of an embodiment is believed at the time of the filing of this patent application to possibly reside broadly in the transport system, wherein in the direction of rotation B of the transport or transfer element 15, the transfer positions are arranged in the sequence indicated below:
first transfer position 17.1,
second transfer position 12.1,
third transfer position 21, and
fourth transfer position 18.1.

Still another feature or aspect of an embodiment is believed at the time of the filing of this patent application to possibly reside broadly in the transport system, wherein in the direction of rotation B of the transport or transfer element 15, the transfer positions are arranged in the sequence indicated below:
first transfer position 17.1,
second transfer position 26.1,
third transfer position 18.1, and
fourth transfer position 15.1.

A further feature or aspect of an embodiment is believed at the time of the filing of this patent application to possibly reside broadly in a plant for the handling of bottles or similar containers 1 with at least two machines 3, 4 which are connected to each other by means of a transport system 2, 2a for the transport of the containers 1, wherein the transport system 2, 2a is realized as the transport system.

Another feature or aspect of an embodiment is believed at the time of the filing of this patent application to possibly reside broadly in the plant, wherein the first machine 3 is a blow molding machine for the manufacture of the containers 1 by stretch blow molding from pre-forms 1a that are made of thermoplastic plastic, and that the blowing machine and the transport system 2, 2a can be controlled so that in the event of a stoppage or a malfunction of the second machine 4, while the feed of the pre-forms 1a to the blow molding machine is interrupted, all or most of the pre-forms 1a that are present in the blow molding machine are formed into containers 1, and when the transfer of containers to the second machine 4 is interrupted, these containers 1 are conveyed into the at least one buffer line 20.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

All of the patents, patent applications or patent publications, which were cited in the International Search Report dated Jun. 5, 2007, and/or cited elsewhere are hereby incorporated by reference as if set forth in their entirety herein as follows: U.S. Pat. No. 5,996,322, published on Dec. 7, 1999, with the title "IN-LINE BOTTLING PLANT;" DE 199 22 873, published on Nov. 23, 2000, with the title "BOTTLE CONVEYOR FOR MOVING BOTTLES INTO AND OUT OF TREATMENT CHAMBER HAS ROTOR AND PAIRS OF STAR WHEELS ARRANGED AROUND ITS CIRCUMFERENCE WITH GRIPPING DEVICES AND TRANSFER COMPONENT TO TRANSFER BOTTLES BETWEEN THEM;" U.S. Pat. No. 6,168,004, published on Jan. 2, 2001, with the title "CONTAINER DISTRIBUTION APPARATUS;" DE 199 28 325, published on Dec. 28, 2000, with the title "BOTTLE FILLING PLANT FOR POLY (ETHYLENE TEREPHTHALATE) BOTTLES COMPRISES BLOW MOULDING DEVICE, BOTTLE WASHING MACHINE AND FILLING MACHINE, BOTTLES BEING TRANSFERRED TO WASHING MACHINE AFTER MOULDING BY SERIES OF CONVEYORS;" and DE 198 24 846, published on Dec. 9, 1999, with the title "COMBINED PLANT FOR BLOWING, FILLING AND LABELLING PLASTIC DRINKS BOTTLES WITH A STORAGE UNIT FOR STORING EXCESS BOTTLES."

The corresponding foreign and international patent publication applications, namely, Federal Republic of Germany Patent Application No. 10 2006 013 800.7, filed on Mar. 24, 2006, having inventors Martin BACKHAUS and Thomas STIENEN, and DE-OS 10 2006 013 800.7 and DE-PS 10 2006 013 800.7, and International Application No. PCT/EP2007/001066, filed on Feb. 8, 2007, having WIPO Publication No. WO 2007/110122 and inventors Martin BACKHAUS and Thomas STIENEN, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the Foreign equivalent patent application PCT/EP2007/001066 and German Patent Application DE 10 2006 013 800.7 is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2007/001066 and DE 10 2006 013 800.7 from which this patent application claims priority which do not have to do with the correction of the translation in this patent application are not to be included in this patent application in the incorporation by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL NOMENCLATURE

1 Bottle
1.1 Neck flange
1a Pre-form
2, 2a Transport system
3 Blow molding machine
4 Filling machine
5 Guide or transport element
6 Heater station
6.1 Transport element
7 Inlet
8 Outlet 9 Rotor or blow-molding unit
9.1 Blow mold
10 Blowing station
11 Discharge
12 Inlet star wheel
12.1 Transfer position
13 Filling position
14 Rotor
15 Transfer star wheel
15.1 Transfer position
16 Receptacle
17, 18 Separation star wheel
17.1, 18.1 Transfer position
19 Transport line
20 Buffer line
21 Buffer line inlet
22, 23 Stopper
24 Grip
25 Electronic control and monitoring system
26 Discharge star wheel
26.1 Transfer position
A Direction of rotation of the rotor 14
B Direction of rotation of the transfer star wheel 15

What is claimed is:

1. A container transfer arrangement for transferring containers from a container forming machine to a container filling machine, said container transfer arrangement comprising:
a first transfer wheel being configured to hold a plurality of containers;
a second transfer wheel, a third transfer wheel, and a fourth transfer wheel being disposed about the periphery of said first transfer wheel;
a transport arrangement being configured and disposed to move containers from a container forming machine to said second transfer wheel;
said second transfer wheel being configured and disposed to move containers from said transport arrangement to said first transfer wheel;
said first transfer wheel being configured and disposed to move containers to said third transfer wheel during a container filling process;
said third transfer wheel being configured and disposed to move containers to a filling machine during the container filling process;
a container storage arrangement comprising an inlet apparatus;
said first transfer wheel being configured and disposed to move containers past said third transfer wheel and to said inlet apparatus upon an interruption in the container filling process;
said inlet apparatus being configured and disposed to move containers from said first transfer wheel into said container storage arrangement;
said fourth transfer wheel being configured and disposed to move stored containers from said container storage arrangement to said first transfer wheel upon resumption of the container filling process; and
said first transfer wheel being configured and disposed to move stored containers from said fourth transfer wheel, past said second transfer wheel, and to said third transfer wheel upon resumption of the container filling process.

2. The container transfer arrangement according to claim 1, wherein, in the direction of rotation of said first transfer wheel, said third transfer wheel follows said second transfer wheel, said inlet apparatus follows said third transfer wheel, said fourth transfer wheel follows said inlet apparatus, and said second transfer wheel follows said fourth transfer wheel.

3. The container transfer arrangement according to claim 2, wherein each of said second transfer wheel, said third transfer wheel, and said fourth transfer wheel comprises a starwheel.

4. The container transfer arrangement according to claim 3, wherein said transfer arrangement comprises at least one of: a first control arrangement configured and disposed to control starting and stopping of the feed of containers to said second transfer wheel, and a second control arrangement configured and disposed to control starting and stopping of the feed of containers to said fourth transfer wheel.

5. The container transfer arrangement according to claim 4, wherein at least one of said first transfer wheel, said second transfer wheel, said third transfer wheel, said fourth transfer wheel, said transport arrangement, said container storage arrangement, and said inlet apparatus, is configured to hold and/or guide containers by a container flange or neck flange.

6. The container transfer arrangement according to claim 5, wherein said second transfer wheel, said third transfer wheel, said inlet apparatus, and said fourth transfer wheel are spaced apart by equal or approximately equal intervals about said first transfer wheel.

7. The container transfer arrangement according to claim 6, in combination with a blow-molding machine, wherein:
said blow-molding machine is configured and disposed to manufacture containers by blow molding of thermoplastic pre-forms;
a control arrangement configured to control the operation of said blow-molding machine;
said control arrangement is configured to stop feed of pre-forms into said blow-molding machine upon an interruption in the filling process; and
said blow-molding machine is configured to manufacture all pre-forms located therein into containers upon an interruption in the filling process.

8. The container transfer arrangement according to claim 1, wherein each of said second transfer wheel, said third transfer wheel, and said fourth transfer wheel comprises a starwheel.

9. The container transfer arrangement according to claim 1, wherein said transfer arrangement comprises at least one of: a first control arrangement configured and disposed to control starting and stopping of the feed of containers to said second transfer wheel, and a second control arrangement configured and disposed to control starting and stopping of the feed of containers to said fourth transfer wheel.

10. The container transfer arrangement according to claim 1, in combination with a blow-molding machine, wherein:
said blow-molding machine is configured and disposed to manufacture containers by blow molding of thermoplastic pre-forms;
a control arrangement configured to control the operation of said blow-molding machine;
said control arrangement is configured to stop feed of pre-forms into said blow-molding machine upon an interruption in the filling process; and
said blow-molding machine is configured to manufacture all pre-forms located therein into containers upon an interruption in the filling process.

11. A container transfer arrangement for transferring containers from a container forming machine to a container filling machine, said container transfer arrangement comprising:
a first transfer wheel being configured to hold a plurality of containers;
a second transfer wheel, a third transfer wheel, and a fourth transfer wheel being disposed about the periphery of said first transfer wheel;

a transport arrangement being configured and disposed to move containers from a container forming machine to said second transfer wheel;

said second transfer wheel being configured and disposed to move containers from said transport arrangement to said first transfer wheel;

said first transfer wheel being configured and disposed to move containers past said third transfer wheel and said fourth transfer wheel to a filling machine during the container filling process;

a container storage arrangement;

said third transfer wheel being configured and disposed to move containers from said first transfer wheel into said container storage arrangement upon an interruption in the container filling process;

said fourth transfer wheel being configured and disposed to move stored containers from said container storage arrangement to said first transfer wheel upon resumption of the container filling process; and said first transfer wheel being configured and disposed to move stored containers from said fourth transfer wheel to a filling machine upon resumption of the container filling process.

12. The container transfer arrangement according to claim 11, wherein, in the direction of rotation of said first transfer wheel, said third transfer wheel follows said second transfer wheel, said fourth transfer wheel follows said third transfer wheel, and said second transfer wheel follows said fourth transfer wheel.

13. The container transfer arrangement according to claim 12, wherein each of said second transfer wheel, said third transfer wheel, and said fourth transfer wheel comprises a starwheel.

14. The container transfer arrangement according to claim 13, wherein said transfer arrangement comprises at least one of: a first control arrangement configured and disposed to control starting and stopping of the feed of containers to said second transfer wheel, and a second control arrangement configured and disposed to control starting and stopping of the feed of containers to said fourth transfer wheel.

15. The container transfer arrangement according to claim 14, wherein at least one of said first transfer wheel, said second transfer wheel, said third transfer wheel, said fourth transfer wheel, said transport arrangement, and said container storage arrangement, is configured to hold and/or guide containers by a container flange or neck flange.

16. The container transfer arrangement according to claim 15, wherein said second transfer wheel and said third transfer wheel are spaced apart by an interval of equal or approximately equal size as an interval by which said third transfer wheel and said fourth transfer wheel are spaced apart.

17. The container transfer arrangement according to claim 16, in combination with a blow-molding machine, wherein:
said blow-molding machine is configured and disposed to manufacture containers by blow molding of thermoplastic pre-forms;
a control arrangement configured to control the operation of said blow-molding machine;
said control arrangement is configured to stop feed of pre-forms into said blow-molding machine upon an interruption in the filling process; and
said blow-molding machine is configured to manufacture all pre-forms located therein into containers upon an interruption in the filling process.

18. The container transfer arrangement according to claim 11, wherein each of said second transfer wheel, said third transfer wheel, and said fourth transfer wheel comprises a starwheel.

19. The container transfer arrangement according to claim 11, wherein said transfer arrangement comprises at least one of: a first control arrangement configured and disposed to control starting and stopping of the feed of containers to said second transfer wheel, and a second control arrangement configured and disposed to control starting and stopping of the feed of containers to said fourth transfer wheel.

20. The container transfer arrangement according to claim 11, in combination with a blow-molding machine, wherein:
said blow-molding machine is configured and disposed to manufacture containers by blow molding of thermoplastic pre-forms;
a control arrangement configured to control the operation of said blow-molding machine;
said control arrangement is configured to stop feed of pre-forms into said blow-molding machine upon an interruption in the filling process; and
said blow-molding machine is configured to manufacture all pre-forms located therein into containers upon an interruption in the filling process.

* * * * *